United States Patent
Desubijana et al.

(10) Patent No.: US 8,788,641 B1
(45) Date of Patent: Jul. 22, 2014

(54) SMALL FORM FACTOR INTERFACE MODULE

(75) Inventors: Joseba M. Desubijana, Minneapolis, MN (US); Larry L. Byers, Apple Valley, MN (US); Gary R. Robeck, Albertville, MN (US)

(73) Assignee: Marvell International Ltd., Hamilton (BM)

( * ) Notice: Subject to any disclaimer, the term of this patent is extended or adjusted under 35 U.S.C. 154(b) by 1608 days.

(21) Appl. No.: 11/936,631

(22) Filed: Nov. 7, 2007

Related U.S. Application Data

(60) Provisional application No. 60/866,974, filed on Nov. 22, 2006.

(51) Int. Cl.
*G06F 15/173* (2006.01)
(52) U.S. Cl.
USPC .......................................................... 709/223

(58) Field of Classification Search
USPC .......................................................... 709/223
See application file for complete search history.

(56) References Cited

U.S. PATENT DOCUMENTS

| | | | |
|---|---|---|---|
| 6,366,965 B1 * | 4/2002 | Binford et al. | 710/8 |
| 6,496,517 B1 | 12/2002 | Gehman et al. | |
| 6,567,879 B1 * | 5/2003 | Benson et al. | 710/305 |
| 6,975,590 B2 | 12/2005 | Killen, Jr. et al. | |
| 2003/0187948 A1 * | 10/2003 | Bellon | 709/217 |
| 2004/0177198 A1 * | 9/2004 | Benson et al. | 710/301 |
| 2006/0129704 A1 * | 6/2006 | Byers et al. | 710/15 |
| 2006/0224734 A1 * | 10/2006 | Aono | 709/224 |

* cited by examiner

*Primary Examiner* — Ninos Donabed

(57) ABSTRACT

Systems, apparatuses, and methods for an interface module to interface with an enclosure services processor are described herein. The interface module may include one or more state machines configured to provide an enclosure service operation. Provision of this enclosure service operation may be at least partially unsupervised by a control processor requesting the enclosure service operation. Other embodiments may be described and claimed.

2 Claims, 48 Drawing Sheets

| Signal Name (SFF-8067) | ASIC I/O Type | Signal Name (SFF Module) | ASIC Pin Name |
|---|---|---|---|
| -ENBL BYP CH1 | Output | ENBLBYPCH1n_O | SFF_ENBL_BYP_CH1n_OP |
| -ENBL BYP CH2 | Output | ENBLBYPCH2n_O | SFF_ENBL_BYP_CH2n_OP |
| -PARALLEL ESI | Output | PARALLELESIn_O | SFF_PARALLEL_ESI_BP |
| READY LED OUT | Bi-directional | READYLEDOUT_O (Output) READYLEDOUT_I (Input) READYLEDOUT_OENA (Bidi Output Enable) | READYLEDOUT_BP (SFF_PARALLEL_ESI_OENA_OP PCB enable control.) |
| POWER CONTROL | Input | POWERCONTROL_I | POWERCONTROL_IP (SFF_SEL_OENA0_OP PCB enable control) |
| START_1 / MATED | Input | START1orMATED_I | SFF_MATED_IP[0] |
| START_2 / MATED | Input | START2orMATED_I | SFF_MATED_IP[1] |
| SEL_6 / -DSK_WR | Bi-directional | SEL6orDSKWRn_O (Output) SEL6orDSKWRn_I (Input) SEL6orDSKWRn_OENA (Bidi Output Enable) | SFF_SEL_INOUT_BP[6] |
| SEL_5 / -DSK_RD | Bi-directional | SEL5orDSKRDn_O (Output) SEL5orDSKRDn_I (Input) SEL5orDSKRDn_OENA (Bidi Output Enable) | SFF_SEL_INOUT_BP[5] |
| SEL_4 / ENCL_ACK | Input | SEL4orENCLACKn_I | SFF_SEL_INOUT_BP[4] |

FIG. 3A

| | | | |
|---|---|---|---|
| SEL_4 / -ENCL_ACK | Input | SEL4orENCLACKn_I | SFF_SEL_INOUT_BP[4] |
| SEL_3 / D(3) | Bi-directional | SEL3orD3_O (Output)<br>SEL3orD3_I (Input)<br>SEL3orD3_OENA (Bidi Output Enable) | SFF_SEL_INOUT_BP[3] |
| SEL_2 / D(2) | Bi-directional | SEL2orD2_O (Output)<br>SEL2orD2_I (Input)<br>SEL2orD2_OENA (Bidi Output Enable) | SFF_SEL_INOUT_BP[2] |
| SEL_1 / D(1) | Bi-directional | SEL1orD1_O (Output)<br>SEL1orD1_I (Input)<br>SEL1orD1_OENA (Bidi Output Enable) | SFF_SEL_INOUT_BP[1] |
| SEL_0 / D(0) | Bi-directional | SEL0orD0_O (Output)<br>SEL0orD0_I (Input)<br>SEL0orD0_OENA (Bidi Output Enable) | SFF_SEL_INOUT_BP[0] |
| FAULT_LED_OUT | Bi-directional | FAULTLEDOUT_O (Output)<br>FAULTLEDOUT_I (Input)<br>FAULTLEDOUT_OENA (Bidi Output Enable) | FAULTLEDOUT_BP<br>(SFF_SEL_OENA5_OP PCB enable control) |
| DV_CTRL_CODE_2 | Input | DVCTRLCODE2_I | SFF_DEV_CNTL_IP[2] |
| DV_CTRL_CODE_1 | Input | DVCTRLCODE1_I | SFF_DEV_CNTL_IP[1] |
| DV_CTRL_CODE_0 | Input | DVCTRLCODE0_I | SFF_DEV_CNTL_IP[0] |

FIG. 3B

| Signal | Bit Cnt | CLK | Description |
|---|---|---|---|
| PCLK | 1 | PCLK | APB Bus Clock – This clock controls register loads, status reads and is the time base for the SFF module. All action in the SFF module occurs on the low to high assertion of the clock. |
| PRESETn | 1 | PCLK | APB Bus Reset – Asserted active low when the APB Bus is reset. When this signal is asserted, all SFF module registers are cleared to a default value, with the exception of specific bits in the SFF Buffer Control Register and other registers of ASIC Input Pins. After reset all SFF pins are configured as determined by the Buffer Control Register default values . |
| PENABLE | 1 | PCLK | APB Bus Enable – This signal is asserted high active for 1 clock cycle by the APB Bridge to enable all register accesses to the SFF module. |
| PSELSFF | 1 | PCLK | APB Bus Select – When this signal is asserted high the SFF module has been selected by the APB Bridge for the APB Bus transaction. One select signal is provided for each APB Bus slave. |
| PADDR[7:0] | 8 | PCLK | APB Bus Address – These 8 bits are from the APB Bus address bus. The SFF module decodes these 8 bits to select the appropriate Memory Mapped Register during an APB Bridge access. These signals are asserted by the APB Bridge at the start of the transaction and remain asserted until the transaction completes. |
| PWRITE | 1 | PCLK | APB Bus Write – This APB Bus signal indicates a write transaction when high and a read transaction when low. This signal is asserted by the APB Bridge at the beginning of the transaction and remains asserted until the transaction completes. |
| PWDATA[31:00] | 32 | PCLK | APB Bus Write Data – The APB Bridge drives these signals all the time. The APB Bridge provides the associated write data when executing a write transaction. |

| Signal | Bit Cnt | CLK | Description |
|---|---|---|---|
| PRDATA[31:00] | 32 | PCLK | APB Bus Read Data – When the APB Bridge selects (PSELSFF) the SFF module and the PWRITE signal is asserted low the SFF module supplies read data based on the decode of the PADDR[7:0]. |
| PADREXCPT | 1 | PCLK | APB Bus – Address Exception – Asserted high when the SFF module detects an "address exception". |

FIG. 6

| Signal | Bit Cnt | CLK | Description |
|---|---|---|---|
| CHALostREFCLK_ByPASSn | 1 | PM_RES_CLK | REF Clock Lost on CHA. The lost REFCLK detection circuit in the CCPM detected loss of reference clock. Bypasses drive for Fibre Channel Loo p. The assertion of this signal causes the assertion of the SFF_ENBL_BYP_CH1n_OP signal. |
| CHBLostREFCLK_ByPASSn | 1 | PM_RES_CLK | REF Clock Lost on CHB. The lost REFCLK detection circuit in the CCPM detected loss of reference clock. Bypasses drive for Fibre Channel Loo p. The assertion of this signal causes the assertion of the SFF_ENBL_BYP_CH2n_OP signal. |
| CD_RAM_ERRReg | 1 | PCLK | CODERAMERR - A fatal Code RAM Error has occurred. |

FIG. 7

| Signal | Bit Cnt | CLK | Description |
|---|---|---|---|
| READYLEDOUT_I | 1 | Asynch | Ready LED OUT signal may optionally be driven (high) by the Enclosure Controller to turn on the external LED. |
| POWERCONTROL_I | 1 | Asynch | Power Control signal is asserted (high), 5V and 12V supplies are applied to the drive circuitry. When this signal is de-asserted (low), 5V and 12V supplies are not connected to the drive circuitry. |
| START1orMATED_I | 1 | Asynch | START1 or MATED signal establishes the method for determining the drive is "mated" to the back panel and for starting the drive's motor. |
| START2orMATED_I | 1 | Asynch | START2 or MATED signal establishes the method for determining the drive is "mated" to the back panel and for starting the drive's motor. |
| SEL6orDSKWRn_I | 1 | Asynch | SEL6 or DSKMWR signal is established by the Enclosure Controller when it detects PARALLELESIn is asserted (low) by the SFF module. |
| SEL5orDSKRDn_I | 1 | Asynch | SEL5 or DSKMRD signal is established by the Enclosure Controller when it detects PARALLELESIn is asserted (low) by the SFF module. |
| SEL4orENCLACKn_I | 1 | Asynch | SEL4 or ENCL_ACKn signal is established by the Enclosure Controller when it detects PARALLELESIn is asserted (low) by the SFF module. The Enclosure Controller also uses this signal to indicate that data from the SFF module has been received, or that data from the Enclosure Controller is available to the SFF module. |
| SEL3orD3_I | 1 | Asynch | SEL3 or D3 signal carries information from the Enclosure Controller to the SFF module. |

| Signal | Bit Cnt | CLK | Description |
|---|---|---|---|
| ENBLBYPCH1n_O | 1 | PCLK | ENBLBYPCH1nOut signal control the Channel 1 Port Bypass Circuits (PBC) located externally. The PBC allows a loop to remain functional in the event of a drive failure or removal. |
| ENBLBYPCH2n_O | 1 | PCLK | ENBLBYPCH2nOut signal control the Channel 2 Port Bypass Circuits (PBC) located externally. The PBC allows a loop to remain functional in the event of a drive failure or removal. |
| PARALLELESIn_O | 1 | PCLK | PARALLELESIn Out signal requests the Enclosure Controller to provide SEL_n physical addressing signals, and to request the execution of an ESI block Read or an ESI Block Write. |
| READYLEDOUT_O | 1 | PCLK | READYLEDOUT Out signal controls the externally visible LED that indicates the state of readiness and activity of the drive. This signal must be an open drain driver as the Enclosure Controller may drive this signal as well. |
| READYLEDOUT_OENA | 1 | PCLK | READYLED OUT Enable signal enables the bidirectional output of the I/O buffer. |
| SEL6orDSKWRn_O | 1 | PCLK | SEL6orDSKWRn Out signal is established by the Enclosure Controller when – PARALLEL ESI signal is asserted (low) to provide the Loop Identifier to the SFF module. This signal is also used by the SFF module to clock data from the SFF module to the Enclosure Controller during the command phase and an outbound data phase. |
| SEL6orDSKWRn_OENA | 1 | PCLK | SEL6orDSKWR OUT Enable signal enables the bidirectional output of the I/O buffer. |
| SEL5orDSKRDn_O | 1 | PCLK | SEL5orDSKRDn Out signal is established by the Enclosure Controller when –PARALLEL ESI signal is asserted (low) to provide the Loop Identifier to the SFF module. This signal is also used by the SFF module to clock data inbounds to the SFF module during the inbound data phase. |
| SEL5orDSKRDn_OENA | 1 | PCLK | SEL5orDSKRDOUTEnable signal enables the bidirectional buffer of the I/O buffer. |

| | | | |
|---|---|---|---|
| SEL3orD3OUT_O | 1 | PCLK | SEL3orD3 Out signal is established by the Enclosure Controller when –PARALLEL ESI signal is asserted (low) to provide the Loop Identifier to the SFF module. This signal, SEL2orD2, SEL1orD1, and SEL0orD0 are also used by SFF module to carry information to and from the enclosure control module. |
| SEL3orD3_OENA | 1 | PCLK | SEL3orD3 OUT Enable signal enables the bidirectional output of the I/O buffer. |
| SEL2orD2_O | 1 | PCLK | SEL2orD2 Out signal is established by the Enclosure Controller when –PARALLEL ESI signal is asserted (low) to provide the Loop Identifier to the SFF module. This signal, SEL3orD3, SEL1orD1, and SEL0orD0 are also used by SFF module to carry information to and from the enclosure control module. |
| SEL2orD2_OENA | 1 | PCLK | SEL2orD2 OUT Enable signal enables the bidirectional output of the I/O buffer. |
| SEL1orD1_O | 1 | PCLK | SEL1orD1 Out signal is established by the Enclosure Controller when –PARALLEL ESI signal is asserted (low) to provide the Loop Identifier to the SFF module. This signal, SEL3orD3, SEL2orD2, and SEL0orD0 are also used by SFF module to carry information to and from the enclosure control module. |
| SEL1orD1_OENA | 1 | PCLK | SEL1orD1 OUT Enable signal enables the bidirectional output of the I/O buffer. |

FIG. 9B

| Bits | Function | Default after PRESETn |
|---|---|---|
| [31:02] | Reserved | 0x0000 0000 |
| [01] | This bit controls the - ENABLE BYP CH2, which controls the Port Bypass Circuits (PBC) located external to the drive. This bit controls the PBC for Channel 2. | 1b |
| [00] | This bit controls the - ENABLE BYP CH1, which controls the Port Bypass Circuits (PBC) located external to the drive. This bit controls the PBC for Channel 1. | 1b |

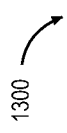

FIG. 13

| Bits | Function | Default after PRESETn |
|---|---|---|
| [31:01] | Reserved | 0x0000 0000 |
| [00] | This bit controls the PARALLEL ESI signal which allows the drive to selectively examine the SEL_ID values that provide physical addressing information or exchange information with the Enclosure Controller. When this bit is set the Drive is asserts SFF PARALLEL ESI requesting a data transfer to or from the Enclosure Controller. | 0b |

FIG. 14

| Bits | Function | Default after PRESETn |
|---|---|---|
| [31:01] | Reserved | 0x0000 0000 |
| [00] | This bit controls the READY LED OUT signal that turns on an externally visible LED that indicates the state of readiness and the activity of the drive. | 0b |

FIG. 17

| Case | START_2 / MATED | START_1 / MATED | Motor Spin Function |
|---|---|---|---|
| 1 | OPEN | OPEN | Un-Mated. Device is not mated. No spin-up will occur and pre-charge average current demand shall not be exceeded. Optional: prepare-for-removal indication to device from enclosure or initiate an ESI transfer request to device from the Enclosure Controller. |
| 2 | OPEN | GROUND | Device is mated. After a mating de-skew time has passed, the motor will spin up when the SCSI start command is received. |
| 3 | GROUND | OPEN | Device is mated. After a mating de-skew time has passed, the motor will spin up after a delay in seconds of 12 times* the modulo 8 value of the numeric SEL_ID of device. |
| 4 | GROUND | GROUND | Device is mated. After mating de-skew time has passed, the motor spins up immediately after completion of its reset and POST functions. |

1800

| Bits | Function | Default after PRESETn |
|---|---|---|
| [31:03] | Reserved | 0x0000 0000 |
| [02] | Nibble Select (NIBSEL) – When this bit is set the most significant nibble [07:04] of the byte is selected from or to the Read or Write Byte Register. When this bit is clear the least significant nibble is selected from or to the Read or Write Byte Register. | 0b |
| [01:00] | When the drive asserts the –PARALLEL ESI signal, the signal -DSK_WR is controlled by SelectRdOrWrReg[01] and signal -DSK_RD is controlled by SelectRdOrWrReg[00]. | 00b |

| Bits | Function | Default after PRESETn |
|---|---|---|
| [31:07] | Reserved | 0x000 0000 |
| [06:00] | The SEL_6 to SEL_0 signals are established by the Enclosure Controller when the –PARALLEL ESI is asserted (low). These signals are stable within 1 microsecond of the assertion of –PARALLEL ESI. | UUU_UUUb |

FIG. 19

| Bits | Function | Default after PRESETn |
|---|---|---|
| [31:08] | Reserved | 0x00 0000 |
| [07:04] | The Most Significant Nibble of the data byte. These bits reflect the values on the signals D3 to D0 when reading the most significant nibble of an ESI transfer. When writing an ESI byte transfer these bits supply the write data to signals D3 to D0 which is the most significant nibble of the byte transfer. | 0xU |
| [03:00] | The Least Significant Nibble of the data byte. These bits reflect the values on the signals D3 to D0 when reading the least significant nibble of an ESI byte transfer. When writing an ESI byte transfer these bits supply the write data to signals D3 to D0 which is the least significant nibble of the byte transfer. | 0xU |

FIG. 20

| Bits | Function | Default after PRESETn |
|---|---|---|
| [31:01] | Reserved | 0x0000 0000 |
| [00] | This bit, when set, drives the FAULT LED OUT signal. This bit should be set when any of the following conditions are detected:<br>• The drive is asserting both of the Enable Bypass signals.<br>• The drive has detected an internal failure.<br>• The drive has been instructed by the host to turn on the Fault LED. | Ub |

| Bits | Function | Default after PRESETn |
|---|---|---|
| [31:03] | Reserved | 0x0000 0000 |
| [02:00] | These bits represent the state of DV_CTRL_CODE_2 to DEV_CTRL_CODE_0 signals. The Enclosure Controller uses these signals to provide a binary code to the drive to control functions such as FC link rate, Power Failure Warning, and Hard reset. | UUUb |

| Bits | Function | Default after PRESETn |
|---|---|---|
| [31:06] | Reserved | 0x000 0000 |
| [5] | This bit controls SEL6orDSKWRn_OENA signal. When this bit is set the signal SEL_6 / -DSK_WR is an output controlled by the SFF module. | 0b |
| [4] | This bit controls SEL5orDSKRDn_OENA signal. When this bit is set the signal SEL_5 / -DSK_RD is an output controlled by the SFF module. | 0b |
| [3] | This bit controls SEL3orD3_OENA signal. When this bit is set the signal SEL_3 / D(3) is an output controlled by the SFF module. | 0b |
| [2] | This bit controls SEL2orD2_OENA signal. When this bit is set the signal SEL_2 / D(2) is an output controlled by the SFF module. | 0b |
| [1] | This bit controls SEL1orD1_OENA signal. When this bit is set the signal SEL_1 / D(1) is an output controlled by the SFF module. | 0b |
| [0] | This bit controls SEL0orD0_OENA signal. When this bit is set the signal SEL_0 / D(0) is an output controlled by the SFF module. | 0b |

| Bits | Function | Default after PRESETn |
|---|---|---|
| [31:02] | Reserved | 0x0000 0000 |
| [02] | This bit set upon detection of any status bit set in the DCC Function Status Register | 0b |
| [01] | This bit set upon detection of a state change on either START_1/MATED or START_2/MATED | 0b |
| [00] | This bit set upon detection of a high to low transition of the –ENCL_ACK input signal. | 0b |

| Bits | Function | Default after PRESETn |
|---|---|---|
| [31:03] | Reserved | 0x0000 0000 |
| [02] | Enable SFF module interrupt (ENSFFINT). This bit must be set so the SFF module may generate interrupts. If clear the interrupt is disabled. | 0b |
| [01] | This bit must be set to enable the ESI Write State Machine operation. | 0b |
| [00] | This bit must be set to enable the ESI Read State Machine operation. | 0b |

| Bits | Function | Default after PRESETn |
|---|---|---|
| [31:02] | Reserved | 0x0000 0000 |
| [01] | Writing a value of one to this bit will reset the ESI Write State Machine. | 0b |
| [00] | Writing a value of one to this bit will reset the ESI Read State Machine. | 0b |

| Bits | Function | Default after PRESETn |
|---|---|---|
| [31:02] | Reserved | 0x0000 0000 |
| [01] | When this bit is set indicates the ESI Write State Machine is busy. | 0b |
| [00] | When this bit is set indicates the ESI Read State Machine is busy. | 0b |

| Bits | Function | Default after PRESETn |
|---|---|---|
| [31:03] | Reserved | 0x0000 0000 |
| [02] | LR State Machine Enable – This bit, when set, enables the Device Control Code Link Rate State Machine. | 0b |
| [01] | PFW State Machine Enable – This bit, when set, enables the Device Control Code Power Failure Warning State Machine. | 0b |
| [00] | HR Enable – This bit, when set, enables the Device Control Code Hard Reset State Machine. | 0b |

| Bits | Function | Default after PRESETn |
|---|---|---|
| [31:03] | Reserved | 0x0000 0000 |
| [02] | LR State Machine Status – This bit, when set, indicates that the Device Control Code Link Rate State Machine has generated an interrupt. | 0b |
| [01] | PFW State Machine Status – This bit, when set, indicates the Device Control Code Power Failure Warning State Machine has generated an interrupt. | 0b |
| [00] | HR Status – This bit, when set, indicates the Device Control Code Hard Reset State Machine has generated an interrupt. | 0b |

FIG. 29

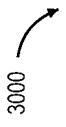

FIG. 30

| Bits | Function | Default after PRESETn |
|---|---|---|
| [31:03] | Reserved | 0x0000 0000 |
| [02] | 4 GHz Valid – This bit, when set, indicates that the Device Control Code Link Rate State Machine supports a 4GHz link rate. | 0b |
| [01] | 2 GHz Valid – This bit, when set, indicates that the Device Control Code Link Rate State Machine supports a 2GHz link rate. | 0b |
| [00] | 1 GHz Valid – This bit, when set, indicates that the Device Control Code Link Rate State Machine supports a 1GHz link rate. | 0b |

3100

| Bits | Function | Default after PRESETn |
|---|---|---|
| [31:07] | Reserved | 0x00 0000 |
| [06:00] | SELOUTDRV[6:0] - When a bit in this field is set and the corresponding enable bit is set the associated SFF_SEL_INOUT_BP[06:00] is controlled as a bidirectional I/O signal by the SFF module. When a bit in this field is clear and the corresponding enable bit is set the associated SFF_SEL_INOUT_BP[06:00] is controlled as an "open drain" I/O signal by the SFF module (see section 1.6). | 0x00 |

| Bits | Function | Default after PRESETn |
|---|---|---|
| [31:02] | Reserved | 0x0000 0000 |
| [1] | This bit controls READYLEDOUT_OENA signal. When this bit is set the signal READY LED OUT is an output controlled by the SFF module. | 0b |
| [0] | This bit controls FAULTLEDOUT_OENA signal. When this bit is set the signal FAULT_LED_OUT is an output controlled by the SFF module. | 0b |

FIG. 32

Note Address 30, enables the
read state machine and the
completion interrupt.

| Hard Reset Sequence | Pointer | 0 | 1 | 2 | 3 | 4 | 5 | 6 | Generate HR Interrupt |
|---|---|---|---|---|---|---|---|---|---|
| | Snapped Device Control Code Value | 5 | 1 | 3 | 2 | 3 | 1 | 5 | |

FIG. 51

SMALL FORM FACTOR INTERFACE MODULE

CROSS-REFERENCES TO RELATED APPLICATIONS

This present application is a non-provisional application of provisional application 60/866,974, filed on Nov. 22, 2006 and claims priority to said provisional application. The specification of said provisional application is hereby incorporated in its entirety, except for those sections, if any, that are inconsistent with this specification.

TECHNICAL FIELD

Embodiments of the present invention relate to the field of computer processing and, in particular, to a small form factor module for communication through an enclosure service interface.

BACKGROUND

Small computer system interface (SCSI) standards define commands, protocols, optical and electrical interfaces that allow for various computing systems to communicate with each other and/or peripheral devices. A SCSI computing system may communicate with an intelligent enclosure managing various devices such as hard drives. Inside an intelligent enclosure, an enclosure processor may communicate with the managed devices via an enclosure service interface (ESI).

A control processor of a managed device may communicate over the ESI with the enclosure processor to perform various enclosure service operations. The control processor may perform these operations by executing firmware instructions that control a set of registers. However, in order to ensure that the operations are performed, the processor may need to be engaged in controlling and/or polling the values of the registers to the exclusion of other performance obligations.

SUMMARY OF THE INVENTION

In view of the challenges in the state of the art, at least some embodiments of the present invention are based on the technical problem of providing an efficient scheme for performing enclosure service operations. A computing system is also described, suitable to solve the problems which at least some of the embodiments are based on, with an interface module having one or more state machines to perform the various enclosure service operations.

More specifically, there is provided, in accordance with various embodiments of the present invention, a managed device controller (MDC) having a control processor configured to control operation of a managed device and an interface module having one or more state machines communicatively coupled to the control processor. The interface module may receive instructions from the control processor and communicate with an enclosure services processor to perform an enclosure service operation based at least in part on the received instructions. In some embodiments, performance of the enclosure service operation may be done at least partially unsupervised by the control processor.

In various embodiments, the MDC may have one or more buses, e.g., Advanced Microcontroller Bus Architecture (AMBA) buses, to communicatively couple the control processor to the interface module.

In various embodiments, the MDC may have a hard drive controller (HDC) communicatively coupled to the control processor. The HDC may communicatively couple the control processor to the managed device and the managed device controller to a host device through a Small Computer System Interface (SCSI).

In various embodiments, the enclosure service operation may be a bypass operation and the one or more state machines may include a link rate (LR) state machine to receive an LR value from the enclosure services processor and to bypass the managed device and the MDC on the SCSI based at least in part on the received LR value.

In various embodiments, the LR state machine may receive one or more valid link rates from the control processor and bypass the managed device and the MDC on the SCSI based at least further in part on the received one or more valid link rates.

In various embodiments, the enclosure service operation may be a write phase operation and the one or more state machines may include a write state machine to transfer write data received from the managed device to the enclosure services processor.

In various embodiments, the enclosure service operation may be a read phase operation and the one or more state machines may include a read state machine to receive read data from the enclosure services processor and provide the read data to the control processor.

In various embodiments, the enclosure service operation may be a power failure warning (PFW) operation and the one or more state machines may include a PFW state machine to receive a PFW signal from the enclosure services processor and transmit an interrupt signal to the control processor based at least in part on the received PFW signal.

In various embodiments, the enclosure service operation may be a hard reset (HR) operation and the one or more state machines may include a HR state machine to receive signals from the enclosure services processor, to detect a hard reset sequence in the received signals, and to transmit an interrupt signal to the control processor based at least in part on the detected hard reset sequence.

In various embodiments, methods may be disclosed for providing, by a control processor configured to control operation of a managed device, instructions to one or more state machines to perform an enclosure service operation; and performing, by the one or more state machines, the enclosure service operation based at least in part on the provided instructions, through communication with an enclosure services processor. In some embodiments, the enclosure service operation may be performed at least partially unsupervised by the control processor.

In various embodiments, the instructions may be provided to the one or more state machines over one or more buses, e.g., AMBA buses.

In various embodiments, the method may include communicatively coupling the managed device to the control processor with an HDC. The HDC may also communicatively couple the MDC to a host device through a SCSI.

In various embodiments, the enclosure service operation may be a bypass operation, the one or more state machines may include an LR state machine, and the method may further include receiving, by the LR state machine, an LR value from the enclosure services processor; and bypassing the managed device and the apparatus on the SCSI based at least in part on the received LR value. The LR state machine may further receive one or more valid LRs from the control processor; and bypass the managed device and the apparatus on the SCSI based at least further in part on the received one or more valid LRs.

In various embodiments, the enclosure service operation may be a write phase operation, the one or more state machines may include a write state machine, and the method may further include transferring, by the write state machine, write data received from the control processor to the enclosure services processor.

In various embodiments, the enclosure service operation may be a read phase operation, the one or more state machines may include a read state machine, and the method may further include receiving, by the read state machine, read data from the enclosure services processor; and providing, by the read state machine, the read data to the control processor.

In various embodiments, the enclosure service operation may be a PFW operation, the one or more state machines may include a PFW state machine, and the method may further include receiving, by the PFW state machine, a PFW signal from the enclosure services processor; and transmitting, by the PFW state machine, an interrupt signal to the control processor based at least in part on the received PFW signal.

In various embodiments, the enclosure service operation may be a HR operation, the one or more state machines may include an HR state machine, and the method may further include receiving, by the HR state machine, signals from the enclosure services processor; detecting, by the HR state machine, an HR sequence in the received signals; and transmitting, by the HR state machine, an interrupt signal to the control processor based at least in part on the detected HR sequence.

In various embodiments, an MDC may include a means for receiving instructions, from a control processor configured to control operation of a managed device, to perform an enclosure service operation; and means for performing the enclosure service operation based at least in part on the provided instructions, through communication with an enclosure services processor. In some embodiments, the means for performing the enclosure service operation may do so at least partially unsupervised by the control processor.

In various embodiments, the enclosure service operation may be a bypass operation and the MDC may further include means for receiving an LR value from the enclosure services processor; and means for bypassing the managed device on a managed device loop based at least in part on the received LR value. The MDC may further include means for receiving one or more valid LRs from the control processor; and means for bypassing the managed device and the apparatus on managed device loop is based at least further in part on the received one or more valid LRs.

In various embodiments, the enclosure service operation may be a write phase operation and the MDC may further include means for transferring write data received from the control processor to the enclosure services processor.

In various embodiments, the enclosure service operation may be a read phase operation and the MDC may further include means for receiving read data from the enclosure services processor and means for providing the read data to the control processor.

In various embodiments, the enclosure service operation may be a PFW operation and the MDC may further include means for receiving a PFW signal from the enclosure services processor and means for transmitting an interrupt signal to the control processor based at least in part on the received PFW signal.

In various embodiments, the enclosure service operation may be an HR operation and the MDC may further include means for receiving signals from the enclosure services processor, means for detecting a HR sequence in the received signals, and means for transmitting an interrupt signal to the control processor based at least in part on the detected HR sequence.

In various embodiments, a system including an enclosure services processor, an enclosure service interface, and an MDC communicatively coupled to the enclosure services processor by the enclosure service interface may be described. The MDC may have a control processor to control operation of a managed device and an interface module having one or more state machines communicatively coupled to receive instructions from the control processor. The one or more state machines may then communicate with the enclosure services processor to perform an enclosure service operation based at least in part on the received instructions. In some embodiments, performance of the enclosure service operation by the one or more state machines may be at least partially unsupervised by the control processor.

In various embodiments, the one or more state machines may include a read state machine, a write state machine, a link rate state machine, a power failure warning machine, and/or a hard reset state machine.

Other features that are considered as characteristic for embodiments of the present invention are set forth in the appended claims.

BRIEF DESCRIPTION OF THE DRAWINGS

The present invention will be described by way of exemplary embodiments, but not limitations, illustrated in the accompanying drawings in which like references denote similar elements, and in which:

FIGS. 3A-3B show a table describing enclosure service interface (ESI) signal assignments of a SFF module in accordance with various embodiments of the present invention;

FIG. 5 is a table describing signals input to an SFF module from an advanced peripheral bus (APB) in accordance with various embodiments of the present invention;

FIG. 6 is a table describing signals output from an SFF module to an APB in accordance with various embodiments of the present invention;

FIG. 7 is a table describing signals input to an SFF module from a CCPM in accordance with various embodiments of the present invention;

FIGS. 8A-8B show a table describing signals input to an SFF module from an ESI in accordance with various embodiments of the present invention;

FIGS. 9A-9C show a table describing signals output from an SFF module to an ESI in accordance with various embodiments of the present invention;

FIG. 13 is a table describing bits of a parallel ESI register in accordance with various embodiments of the present invention;

FIG. 14 is a table describing bits of a ready light emitting diode (LED) out register in accordance with various embodiments of the present invention;

FIG. 17 is a table describing control of a hard drive based on bits of a start or mated register in accordance with various embodiments of the present invention;

FIG. 18 is a table describing bits of a select read or write register in accordance with various embodiments of the present invention;

FIG. 19 is a table describing bits of a read select register in accordance with various embodiments of the present invention;

FIG. 20 is a table describing bits of a read or write byte register in accordance with various embodiments of the present invention;

FIG. 21 is a table describing bits of a fault LED out register in accordance with various embodiments of the present invention;

FIG. 22 is a table describing bits of a device control register in accordance with various embodiments of the present invention;

FIG. 23 is a table describing bits of a select output enable register in accordance with various embodiments of the present invention;

FIG. 24 is a table describing bits of an SFF interrupt register in accordance with various embodiments of the present invention;

FIG. 25 is a table describing bits of an ESI state machine enable register in accordance with various embodiments of the present invention;

FIG. 26 is a table describing bits of an ESI state machine reset register in accordance with various embodiments of the present invention;

FIG. 27 is a table describing bits of an ESI state machine busy register in accordance with various embodiments of the present invention;

FIG. 28 is a table describing bits of a device control code (DCC) function enable register in accordance with various embodiments of the present invention;

FIG. 29 is a table describing bits of a DCC function status register in accordance with various embodiments of the present invention;

FIG. 30 is a table describing bits of a valid link rate register in accordance with various embodiments of the present invention;

FIG. 31 is a table describing bits of a select out drive mode register in accordance with various embodiments of the present invention;

FIG. 32 is a table describing bits of an LED output enable register in accordance with various embodiments of the present invention;

FIG. 39 is a write phase timing diagram focusing on the perspective of an ESI in accordance with various embodiments of the present invention;

FIG. 51 is a table describing two sequences used by a hard reset state machine in accordance with various embodiments of the present invention.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional.

"Circuitry," as used in any embodiment herein, may comprise, for example, singly or in any combination, hardwired circuitry, programmable circuitry, state machine circuitry, and/or firmware that stores instructions executed by programmable circuitry.

A "state machine," as used in any embodiment herein, may be a hardware implemented state machine comprising, for example, a programmable logic device, a programmable logic controller, logic gates and flip flops, and/or relays. In various embodiments, a state machine may be additionally/alternatively implemented in software and/or firmware.

Figure 1:
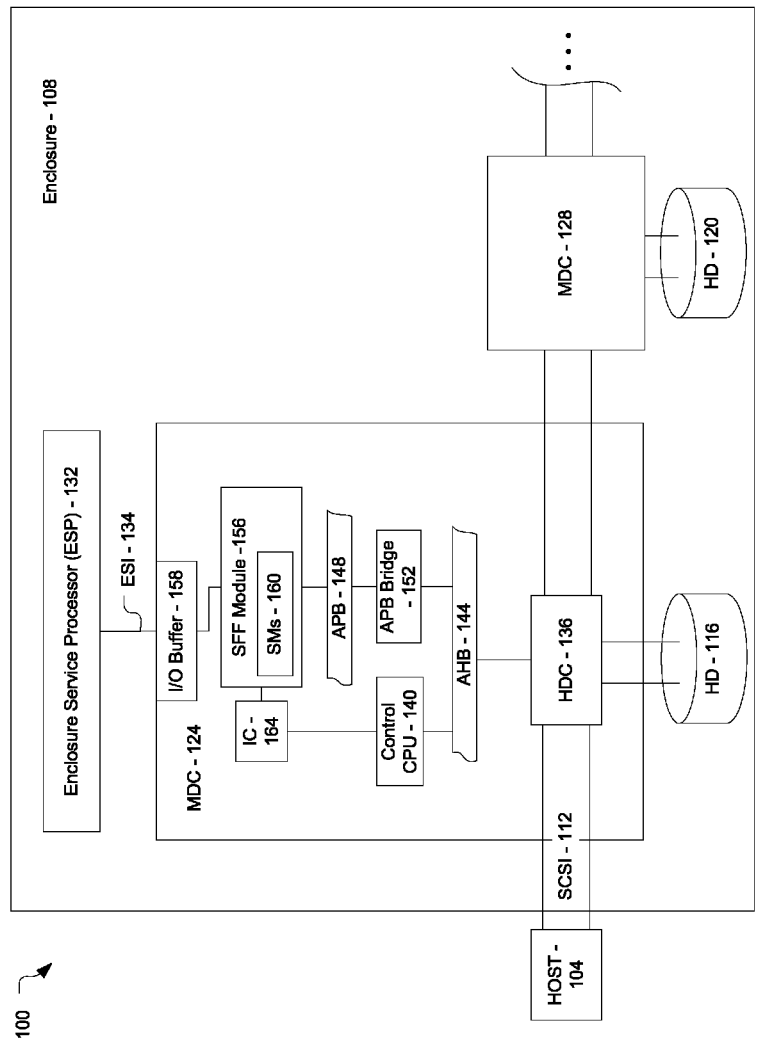
FIG. 1 is a computing system in accordance with various embodiments of the present invention.

FIG. 1 is a computing system 100 in accordance with embodiments of the present invention. The system 100 may have a host 104 communicatively coupled to an enclosure 108 by a small computer system interface (SCSI) link 112. In some embodiments the SCSI link 112 may include a physical layer transport such as, but not limited to, fibre channel (FC), serial attached SCSI (SAS), or serial storage architecture (SSA). In this embodiment, the enclosure 108 may also be referred to as a SCSI enclosure.

The enclosure 108 may include a number of managed devices, e.g., hard drives 116 and 120, to provide various computing resources to the host 104. The managed devices may be sequentially coupled to one another in a managed device loop with communication being arbitrated by managed device controllers (MDC) corresponding to respective managed devices, e.g., MDC 124 or MDC 128 respectively corresponding to hard drive 116 or 120. In some embodiments, the managed device loop may be referred to as an FC-arbitrated loop (AL).

In various embodiments, the enclosure 108 may include an enclosure services processor (ESP) 132 to manage the enclosure 108. The ESP 132 may also be referred to as the enclosure controller. The ESP 132 may be communicatively coupled to at least one of the MDCs through an enclosure service interface (ESI) 134. While the embodiment shown in FIG. 1 shows the ESP 132 coupled to only one of the MDCs, e.g., MDC 124, in other embodiments fault-tolerance objectives may call for the ability to communicate with one or more of the other MDCs, e.g., MDC 128, in case a communication problem occurs between MDC 124 and ESP 132.

The MDC 124 may include a controller, e.g., hard drive controller (HDC) 136, which allows a control processor, e.g., control central processing unit (CPU) 140 to communicate with the hard drive 116. The control CPU 140 may be communicatively coupled to the HDC 136 through a bus compatible with a protocol such as, but not limited to, a protocol introduced in Advanced Microcontroller Bus Architecture (AMBA) specification Rev. 2.0 published by ARM Ltd. on May 13, 1999, along with any revisions, amendments, or updates thereto. In some embodiments, the control CPU 140 may be communicatively coupled to the HDC 136 through a high-performance system bus, e.g., an AMBA high-performance bus (AHB) 144. The AHB 144 may service relatively high-clock frequency modules such as, e.g., the control CPU 140 and the HDC 136.

The MDC 124 may also have a bus for relatively low-power peripherals, e.g., an advanced peripheral bus (APB) 148. The APB 148 may be designed to reduce power consumption and interface complexity in provision of peripheral functions. The APB 148 may be coupled to the AHB 144 through an APB bridge 152.

The MDC 124 may have a small form factor (SFF) module 156 to facilitate communication between various components of the MDC 124, e.g., the control CPU 140, and the ESP 132. The SFF module 156 may have ports coupled to the APB 148 and ports coupled to an input/output buffer 158.

In various embodiments, the SFF module 156 may communicate with the ESP 132 through the ESI 134 according to one or more specifications published by the SFF Committee, e.g., SFF-8067 Rev 3.4 published Apr. 20, 2005 and/or SFF-8045 Rev 4.2 published Aug. 30, 1999 along with any revisions, amendments, or updates thereto. The SFF-8067 protocol extends the functions of the SFF-8045 protocol by allowing bidirectional communication between the MDC 124 and the ESP 132. The SFF-8067 protocol may allow the MDC 124 to discover whether a backpanel of the enclosure 120 supports the SFF-8045 and/or the SFF-8067 protocols.

The SFF module 156 may have one or more state machines (SMs) 160 that may be controlled by the control CPU 140 to perform various enclosure service operations with the ESP 132. The enclosure service operations may include a variety of operations such as, but not limited to, an enclosure discovery operation; device control operation (e.g., a command operation, a bypass operation, a power failure warning (PFW) operation, a hard reset operation, etc.); a write operation; a read operation; and/or an enclosure initiated ESI transfer operation. These operations, and the SMs 160 that perform them, will be discussed in further detail herein.

The control CPU 140 may control the SFF module 156 with a set of memory mapped registers in the SFF module 156 that are accessed through the APB 148. After the control CPU 140 sets the registers appropriately, it may move on to other tasks. The SMs 160 may then perform the operation over a given period of time and, once the operation is completed, alert the control CPU 140 to its completion. Accordingly, the SMs 160 may be said to operate at least partially unsupervised by the control CPU 140. That is, the control CPU 140 does not need to provide consistent monitoring of the SMs 160 and/or the operation with which they are assigned.

The SFF module 156 may also be coupled to an interrupt controller (IC) 164 configured to generate and transmit an interrupt signal to the control CPU 140. In various embodiments, the IC 164 may directly transmit the interrupt signal to the control CPU 140 or may route it through one or more other components, e.g., through the APB 148, APB bridge 152, and AHB 144. The IC 164 may be a discrete component or may be part of another component, e.g., the SFF module 156.

In some embodiments, the MDC 124 may be a system-on-a-chip (SOC) provided through, e.g., an application-specific integrated circuit (ASIC) or an application-specific standard product (ASSP).

Figure 2:
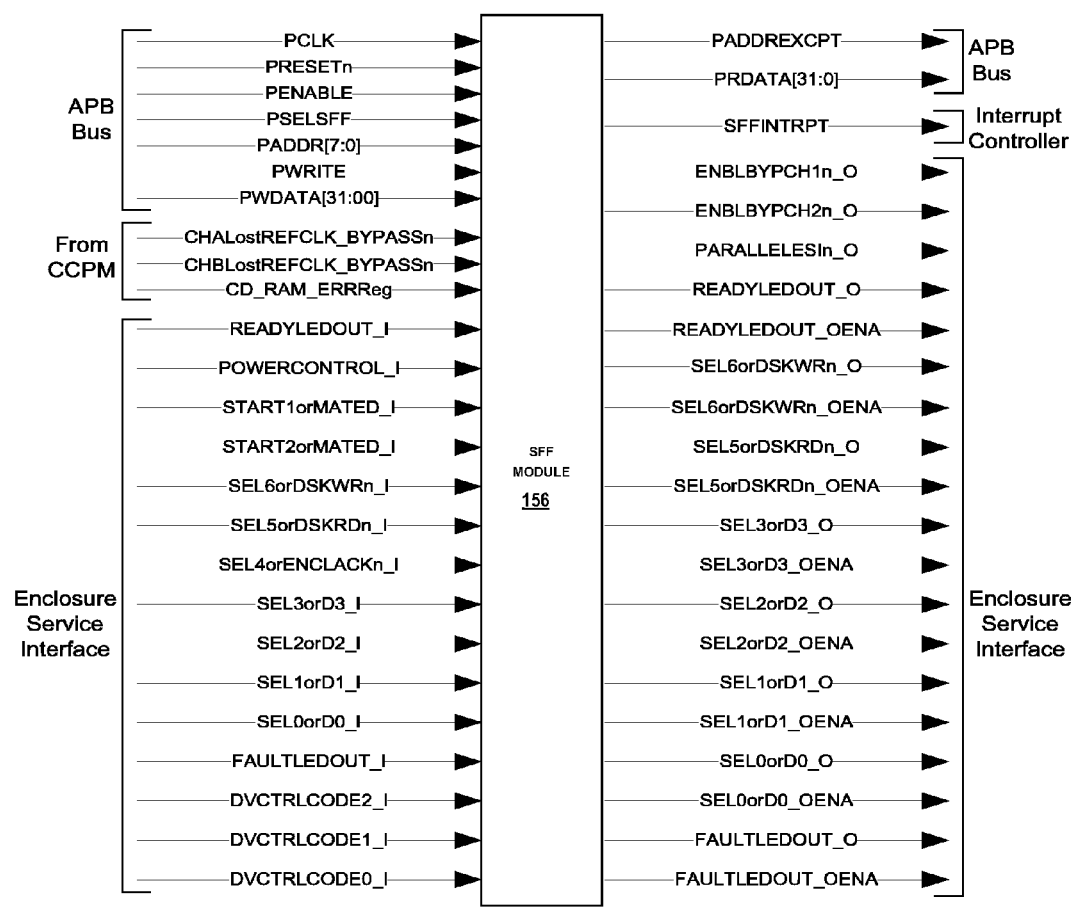
FIG. 2 is a small form factor (SFF) module in accordance with various embodiments of the present invention.

FIG. 2 is the SFF module 156 in accordance with various embodiments of the present invention. In FIG. 2, the signals received by the SFF module 156 may be shown on the left-hand side, while the signals transmitted by the SFF module 156 may be shown on the right-hand side. In particular, the SFF module 156 may receive signals from the ESI 134, the APB 148, and the configuration clock and power module (CCPM), which may provide general system configuration information (e.g., clock control, power management, etc.). The SFF module 156 may transmit signals to the APB 148, IC 164, and ESI 134. These signals, which may be described in further detail with reference to the tables illustrated in FIGS.

3-10, may provide for the connectivity between the ESP 132 and the MDC 124 as described herein with reference to various embodiments.

While many of the embodiments described herein may be described in detail with, e.g., specific memory offsets, voltages, logic arrangements, signal definitions, etc., these specifics are present to facilitate discussion of the particular embodiments and are not intended to limit other embodiments.

FIGS. 3A-3B are a table 300 describing the ESI signal assignments of the SFF module 156 in accordance with various embodiments of the present invention. As used herein, the dash character (−) at the beginning or end of a signal name, e.g., −ENBL BYP CH1, may indicate that the signal may be asserted at a low level (active low). Absence of a dash or a plus character (+) at the beginning or end of a signal name may indicate that the signal is asserted at a high level (active high). In some embodiments, a signal's output voltage may be 2.5 volts (V) and an input/output pad of the MDC 124 may be 3.3V tolerant.

Figure 4:
FIG. 4 is a table describing signals internal to an SFF module in accordance with various embodiments of the present invention.

FIG. 4 is a table 400 describing signals internal to the SFF module 156 in accordance with various embodiments of the present invention.

FIG. 5 is a table 500 describing signals input to the SFF module 156 from the APB 148 in accordance with various embodiments of the present invention.

FIG. 6 is a table 600 describing signals output from the SFF module 156 to the APB 148 in accordance with various embodiments of the present invention.

FIG. 7 is a table 700 describing signals input to the SFF module 156 from the CCPM in accordance with various embodiments of the present invention. The signals shown in table 700 may be system control signals that may result from monitoring clock signals. If one or more of the signals are asserted, an oscillator driving the clock signal may have failed and the hard drive 116 and MDC 124 may have become inoperable. The SFF module 156 may then bypass the hard drive 116 and MDC 124 on the SCSI 112 and/or notify the backpanel of the failure. The system control signals may be ored with ENBLBYPCH1n and ENBLBYPCH2n to drive the ENBLBYPCH1n_O and ENBLBYPCH2n_O to the backpanel. In some embodiments, the system control signals may include other signals, e.g., a signal input from the HDC 136 that indicates the SCSI 112 had a failure. Assertion of this signal, similar to the other system control signals, may cause the SFF module 156 to bypass hard drive 116 for the SCSI 112, e.g., FC-AL loop.

Figure 8B:

FIGS. 8A-8B are a table 800 describing signals input to the SFF module 156 from the ESI 134 (through the I/O buffer 158) in accordance with various embodiments of the present invention. The signals described in table 800 may be asynchronous to the SFF module 156. Each of these signals may be synchronized to PCLK.

Figure 9C:

FIGS. 9A-9C are a table 900 describing signals output from the SFF module 156 to the ESI 134 (through the I/O buffer 158) in accordance with various embodiments of the present invention.

Figure 10:
FIG. 10 is a table describing an interrupt signal output from an SFF module to an interrupt controller in accordance with various embodiments of the present invention.

FIG. 10 is a table 1000 describing an interrupt signal output from the SFF module 156 to the IC 164 in accordance with various embodiments of the present invention. This signal may be controlled by the state machines 160 to interrupt the control CPU 140 upon the occurrence of certain events to be described in more detail herein.

Figure 11:
FIG. 11 is a table describing memory mapped registers of an SFF module in accordance with various embodiments of the present invention.

FIG. 11 is a table 1100 describing memory mapped registers of the SFF module 156 in accordance with various embodiments of the present invention. These registers may be controlled by the control CPU 140 to provide a communication channel with the ESP 132 for execution of various enclosure service operations.

The registers marked with an asterisk in table 1100 may be protected when particular state machines 160, e.g., a write state machine or a read state machine, are busy. A control CPU 140 attempt to write to these protected registers when the particular state machines are busy may result in an address exception error.

In various embodiments, the signals of the SFF module 156 that are active low may be represented as a value of a binary one in the associated registers.

The registers introduced in table 1100 are described in more detail in the following figures.

Figure 12:
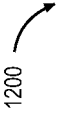
FIG. 12 is a table describing bits of an enable bypass register in accordance with various embodiments of the present invention.

FIG. 12 is a table 1200 describing bits of the enable bypass register (EnableBypassReg) in accordance with various embodiments of the present invention. The EnableBypassReg may have a memory address offset of 0x00 and may be a write-only register.

FIG. 13 is a table 1300 describing bits of the parallel ESI register (ParallelESIReg) in accordance with various embodiments of the present invention. The ParallelESIReg may have a memory address offset of 0x04 and may be a read/write register. The bit of the ParallelESIReg may be set by the control CPU 140 if one of the following conditions occur: (1) the START_x/MATED signals indicate case 1 (both open—see FIG. 17) notifying the drive the ESP 132 is initiating an ESI transaction; or (2) a SCSI command SEND DIAGNOSTIC or RECEIVE DIAGNOSTIC RESULTS is received from the host 104.

FIG. 14 is a table 1400 describing bits of the ready light emitting diode (LED) out register (RdyLEDOutReg) in accordance with various embodiments of the present invention. The RdyLEDOutReg may have a memory address offset of 0x08 and may be a read/write register.

Figure 15:
FIG. 15 is a table describing bits of a power control register in accordance with various embodiments of the present invention.

FIG. 15 is a table 1500 describing bits of the power control register (PowerCtrlReg) in accordance with various embodiments of the present invention. The PowerCtrlReg may have a memory address offset of 0x0C and may be a read-only register.

Figure 16:
FIG. 16 is a table describing bits of a start or mated register in accordance with various embodiments of the present invention.

FIG. 16 is a table 1600 describing bits of the start or mated register (StartorMatedReg) in accordance with various embodiments of the present invention. The StartorMatedReg may have a memory address offset of 0x10 and may be a read-only register.

FIG. 17 is a table 1700 describing control of the hard drive 116 based on bits of the StartorMatedReg in accordance with various embodiments of the present invention. In some embodiments, the delay value stated in case 3 may be reduced to reflect various anticipated time durations of peak current drains at the 12V and/or 5V source during motor spin up. In certain embodiments, the delay may not exceed 12 seconds.

While the START__1/MATED and START__2/MATED signals shown in FIGS. 16 and 17 indicate whether the device has been mated to the backpanel, these signals may additionally/alternatively alert the device to an impending removal from the backpanel or that the ESP 132 has initiated an ESI signal to the device required an action from the managed device.

FIG. 18 is a table 1800 describing bits of the select read or write register (SelectRdorWrReg) in accordance with various embodiments of the present invention. The SelectRdorWrReg may have a memory address offset of 0x14 and may be a write-only register.

In some embodiments, the SelectRdorWrReg[01] or SelectRdorWrReg[00] may be conditioned by ParallelE-SIReg being set asserting the interface signal –SFF_PARALLEL_ESI_BP.

FIG. 19 is a table 1900 describing bits of the read select register (ReadSELReg) in accordance with various embodiments of the present invention. The ReadSELReg may have a memory address offset of 0x18 and may be a read-only register. This register may reflect the signals from SEL__6 to SEL__0 signals.

FIG. 20 is a table 2000 describing bits of the read or write byte register (RdOrWrByteReg) in accordance with various embodiments of the present invention. The RdOrWrByteReg may have a memory address offset of 0x1C and may be a read/write register.

In some embodiments, when reading data from the ESP 132, signals D3 to D0 may be selected to the appropriate nibble, most significant nibble or least significant nibble, based on control from a read state machine of the state machines 160 or from the NIBSEL bit of the SelectRdOrWrReg. When the read state machine is active the selection from the SelectRdOrWrReg may be ignored.

In some embodiments, when writing data to the ESP 132, the appropriate nibble may be selected from RdOrWrByteReg to D3 to D0 based on control from a write state machine of the state machines 160 or from the NIBSEL bit of the SelectRdOrWrReg. When the write state machine is active, the selection from the SelectRdOrWrReg may be ignored.

In some embodiments, writing to the RdOrWrByteReg with the write state machine enabled (ESIStMchnENBLReg[01] set) and the Parallel ESI signal asserted (ParallelESIReg[0] set) may initiate an ESI Interface write transaction. Further discussion of the read and write state machines are provided herein.

FIG. 21 is a table 2100 describing bits of the fault light-emitting diode (LED) out register (FltLEDOutReg) in accordance with various embodiments of the present invention. The FltLEDOutReg may have a memory address offset of 0x20 and may be a read/write register.

FIG. 22 is a table 2200 describing bits of the device control register (DvcCtrlReg) in accordance with various embodiments of the present invention. The DvcCtrlReg may have a memory address offset of 0x24 and may be a read-only register. These SFF interface signals may be reflected directly in this register (e.g., no inversion).

FIG. 23 is a table 2300 describing bits of the select output enable register (SELOutEnblReg) in accordance with various embodiments of the present invention. The SELOutEnblReg may have a memory address offset of 0x28 and may be a read/write register.

FIG. 24 is a table 2400 describing bits of the SFF interrupt register (SFFInterruptReg) in accordance with various embodiments of the present invention. The SFFInterruptReg may have a memory address offset of 0x2C and may be a read-only, write-one-to-clear register. That is, if the bit coming from the APB 148 is set, then the bit that is set in the register is cleared and no other bit in the register will be disturbed.

FIG. 25 is a table 2500 describing bits of the ESI state machine enable register (ESIStMchnEnblReg) in accordance with various embodiments of the present invention. The ESIStMchnEnblReg may have a memory address offset of 0x30 and may be a read/write register.

FIG. 26 is a table 2600 describing bits of the ESI state machine reset register (ESIStMchnRstReg) in accordance with various embodiments of the present invention. The ESIStMchnRstReg may have a memory address offset of 0x34 and may be a write-only register.

FIG. 27 is a table 2700 describing bits of the ESI state machine busy register (ESIStMchnBusyReg) in accordance with various embodiments of the present invention. The ESIStMchnBusyReg may have a memory address offset of 0x38 and may be a read-only register.

FIG. 28 is a table 2800 describing bits of the device control code (DCC) function enable register (DCCFunctionEnblReg) in accordance with various embodiments of the present invention. The DCCFunctionEnblReg may have a memory address offset of 0x3C and may be a read/write register.

FIG. 29 is a table 2900 describing bits of the DCC function status register (DCCFunctionStatusReg) in accordance with various embodiments of the present invention. The DCCFunctionStatusReg may have a memory address offset of 0x40 and may be a read/write register.

The DCCFunctionStatusReg may contain the status of a device control function state machine of the state machines 160. In some embodiments, a device control function interrupt may be generated when any of the bits in the DCCFunctionStatusReg are set.

FIG. 30 is a table 3000 describing bits of the valid link rate register (ValidLinkRateReg) in accordance with various embodiments of the present invention. The ValidLinkRateReg may have a memory address offset of 0x44 and may be a read/write register.

FIG. 31 is a table 3100 describing bits of the select out drive mode register (SelOutDrvMdReg) in accordance with various embodiments of the present invention. The SelOutDrvMdReg may have a memory address offset of 0x48 and may be a read/write register.

FIG. 32 is a table 3200 describing bits of the LED out enable register (LEDOutEnblReg) in accordance with various embodiments of the present invention. The LEDOutEnblReg may have a memory address offset of 0x4C and may be a read/write register.

In various embodiments, the SFF module 156 may be used to detect a number of addressing exceptions. In some embodiments, the SFF module 156 may examine PADDR[7:0] for addressing exceptions (e.g., undefined, reserved, read to write-only, or write to read-only addresses). Any access of these types may result in the SFF module 156 asserting the PADREXCPT signal to the APB Bridge 152. Operations causing addressing exceptions may not change the state of the SFF module 156.

In some embodiments, read operations that cause addressing exceptions may return zeroes on the PRDATA[31:00].

In various embodiments, the SFF module 156 may be a 32-bit word aligned module; therefore, the SFF module 156 may examine PADDR[1:0], if these two bits are not zero the access may be treated as an addressing exception and PADREXCPT may be asserted.

In various embodiments, an erroneous operation of the write or read state machines may cause addressing exceptions. For example, a state machine may detect one of the following erroneous start conditions: starting the state machine when the state machine is busy; starting the state machine when ParallelESIReg[0] is equal to one; or, when the read or write state machines is active, a write access to ParallelESIReg, SelectRdOrWrReg, RdOrWrByteReg, SELOutEnblReg, or ESIStMchnENBLReg.

In some embodiments if the PADREXCPT mask bit PadrExcptMskReg[13] is set in the APB Bridge 152, the address exception may be ignored by the APB Bridge 152.

Figure 33:
FIG. 33 is a table describing control of output drivers on an SFF module in accordance with various embodiments of the present invention.

FIG. 33 is a table 3300 describing control of output drivers on the SFF module 156 in accordance with various embodiments of the present invention. In particular, the SFF module 156 may control the output drivers of the SFF_SEL_I-NOUT_BP[6:0] I/O pads as either bidirectional or as open drain drivers. In some embodiments, the SFF module 156 may control a particular output driver as an open drain driver so that other drivers may be on the interface and cause some events to occur.

Figure 34:
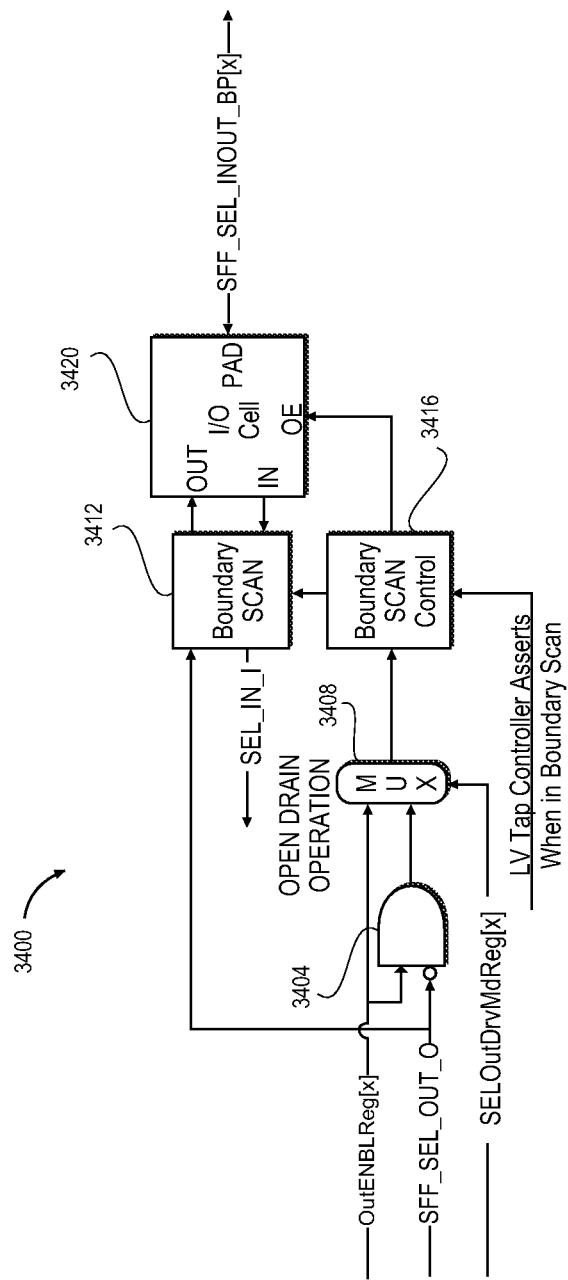
FIG. 34 is a schematic of an input/output (I/O) pad of an SFF module in accordance with various embodiments of the present invention.

FIG. 34 is a schematic diagram of an I/O pad driver 3400 of the SFF module 156 in accordance with various embodiments of the present invention. In this embodiment an OutENBL-Reg[x] value may be provided to a logic gate 3404 and a multiplexer (mux) 3408; a SFF_SEL_OUT_O value may be provided to the logic gate 3404 and a boundary scan block 3412; and a SELOutDrvMdReg[x] value may be provide to a selector pin of the mux 3408. The SelOutDrvMdReg value may indicate whether the I/O pad driver 3400 will function as an open-drain or a bi-directional driver. The mux 3408 may provide one of the inputs to a boundary scan control block 3416, which also may receive a signal asserted by the tap controller when the device is in a boundary scan.

The boundary scan control block 3416 may provide a signal to the boundary scan block 3412 and to an output enable (OE) input of an I/O cell 3420. Depending on the operating state of the I/O pad driver 3400 the I/O cell 3420 may transmit or receive data through the SFF_SEL_INOUT_BP[x] pad.

In various embodiments, when a fatal error occurs in the MDC 124 the SCSI interface may be bypassed so as to not impact the storage network. There may be three possible ways the SFF_ENBL_BYP_CH1n_OP and SFF_ENBL_BYP_CH2n_OP may be asserted: (1) loss of reference clock is detected asserting CHALostREFCLK_BYPASSn and or CHBLostREFCLK_BYPASSn; (2) a fatal Code RAM Error is detected asserting CD_RAM_ERRReg; or (3) the control CPU 140 sets EnableBypassReg[00] and or [01].

These conditions may be represented by: SFF_ENBL_BYP_CH1n_OP==CHALostREFCLK_BYPASSn||!EnableBypassReg[00]||!CD_RAM_ERRReg, for channel one; and SFF_ENBL_BYP_CH2n_OP==CHBLostREFCLK_BYPASSn||!EnableBypassReg[01]||!CD_RAM_ERRReg, for channel two.

Figure 35A:
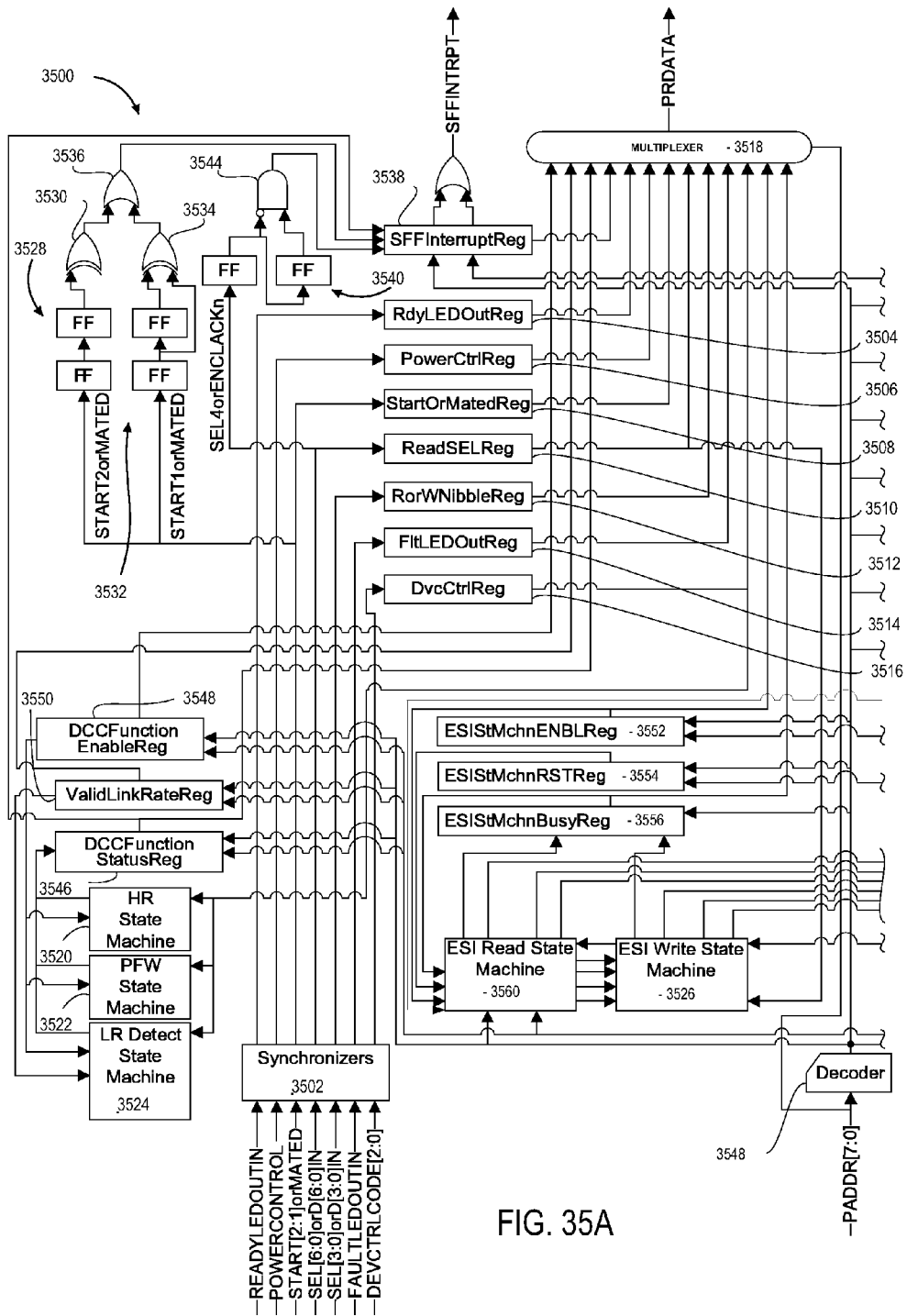
FIGS. 35A-35B is a schematic diagram of an SFF module in accordance with various embodiments of the present invention.
Figure 35B:
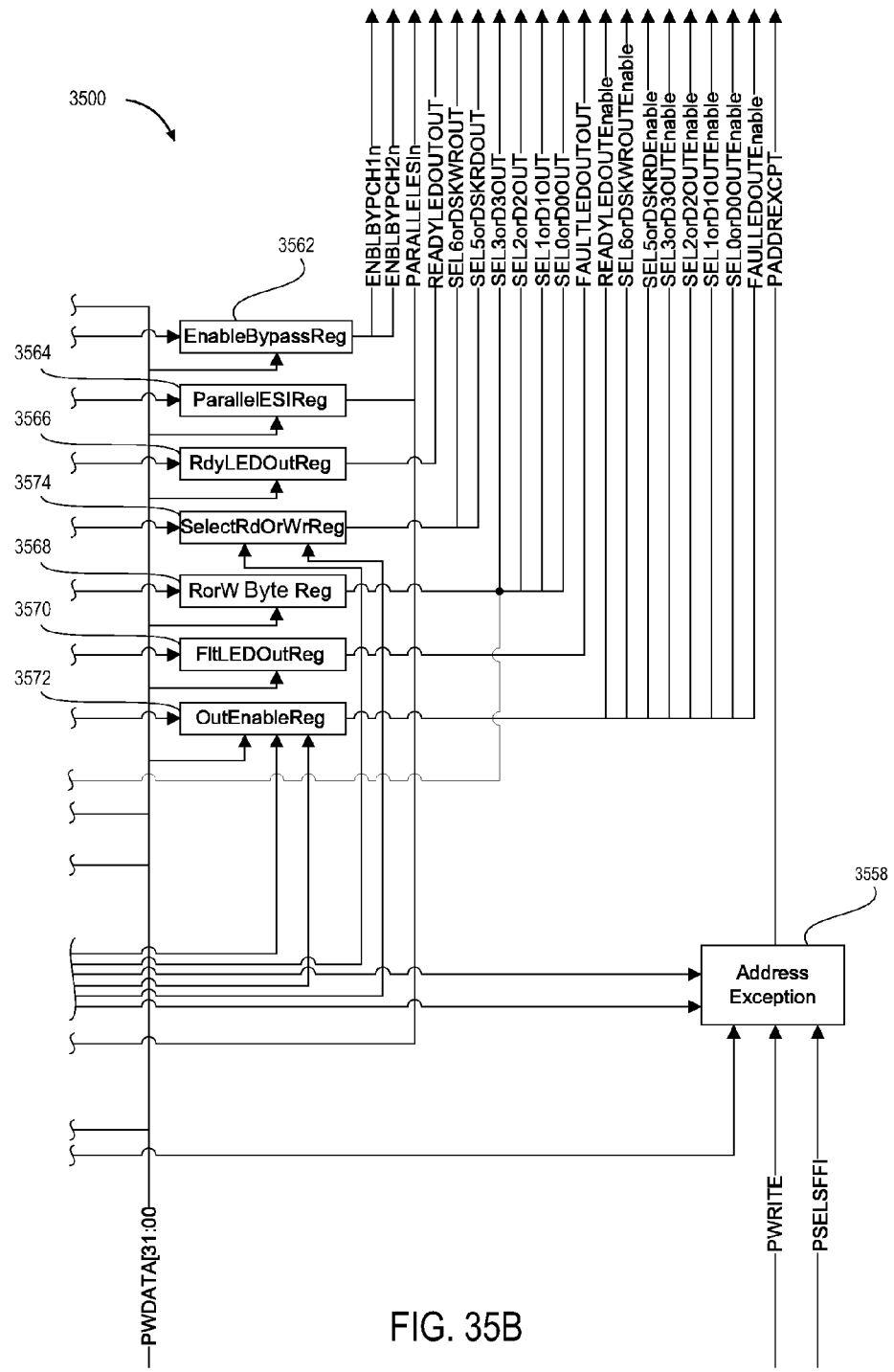

FIGS. 35A-35B are a schematic diagram 3500 of the SFF module 156 in accordance with various embodiments of the present invention. In this embodiment, synchronizers 3502 may receive signals (e.g., READYLEDOUTIN, POWERCONTROL, START[2:1] or MATED, SEL[6:0] or D[6:0]IN, SEL[3:0] or D[3:0]IN, FAULTLEDOUTIN, and DEVCTRLCODE[2:0]), synchronize the signals, and transmit the synchronized signals to various registers (e.g., RdyLEDOutReg 3504, PowerCtrlReg 3506, StartOrMatedReg 3508, ReadSELReg 3510, RoWNibbleReg 3512, FltLEDOutReg 3514, and DvcCtrolReg 3516, respectively). The registers may then be read out to multiplexer 3518.

The value of the DvcCtrolReg 3516 may also be provided to a hard reset (HR) state machine 3520, a power failure warning (PFW) state machine 3522 and a link rate (LR) state machine 3524. The value of the ReadSELReg 3510 may also be provided to an ESI write state machine 3526 (which may also be referred to as simply a "write state machine").

In addition to being provided to the StartOrMatedReg 3516, the START[2:1] or MATED signals may be provided to various logic gates. In particular, the START2orMATED signal may be provided to a first set of flip-flops (FFs) 3528 and an exclusive or (EX-OR) gate 3530; and the START1orMATED signal may be provided to a second set of FFs 3532 and an EX-OR gate 3534, as shown. The EX-OR gates 3530 and 3534 may be coupled into an OR gate 3536, which, in turn, is coupled to a SFFInterruptReg 3538.

In addition to being provided to the ReadSelReg 3510, the SEL[6:0] or D[6:0]IN signals, and, in particular, the SEL4orENCLACKn signal, may be coupled to a pair of FFs 3540 and an AND gate 3544, as shown. One of the inputs on the AND gate 3544 may be inverted. The AND gate 3544 may be coupled to the SFFInterruptReg 3538.

The HR state machine 3520, the PFW state machine 3522, and the LR state machine 3524 may be coupled to a DCCFunctionStatusReg 3546. The DCCFunctionStatusReg 3546 may also receive the PWDATA[31:0] and PADDR[7:0], the latter being decoded by a decoder 3548. The PADDR[7:0] may also bypass the decoder 3548 and be coupled into a selector pin of the multiplexer 3518. The DCCFunctionStatusReg 3546 may output its value to the SFFInterruptReg 3538 and the multiplexer 3518.

The PWDATA[31:0] and the decoded PADDR[7:0] may also be provided to a DCCFunctionEnableReg 3548 and a ValidLinkRateReg 3550. The DCCFunctionEnableReg 3548 is output to the HR state machine 3520, the PFW state machine 3522, and the LR detect state machine 3524. The ValidLinkRateReg 3550 may be output to the LR detect state machine 3524.

The decoded PADDR[7:0] may also be provided to the SFFInterruptReg 3538, an ESIStMchnENBLReg 3552, an ESIStMchnRSTReg 3554, an ESIStMchnBusyReg 3556, and an address exception block 3558.

In addition to receiving the decoded PADDR[7:0], the ESIStMchnENBLReg 3552 and the ESIStMchnRSTReg 3554 may also receive the PWDATA[31:00]. The PWDATA[31:00] may also be coupled to the SFFInterruptReg 3538.

The ESIStMchnENBLReg 3552 may output its value to the multiplexer 3518 and to an ESI read state machine 3560 (which may also be referred to as simply a "read state machine"). The ESIStMchnRSTReg 3554 and the ESIStMchnBusyReg 3556 may also output their respective values to the ESI read state machine 3560, which may be coupled to the ESI write state machine 3526 as shown. The ESIStMchnBusyReg 3556 may also output its value to the multiplexer 3518.

The PWDATA[31:0] and the decoded PADDR[7:0] may also be provided to an EnableBypassReg 3562; ParallelESIReg 3564; RdyLEDOutReg 3566; RorWByteReg 3568; FltLEDOutReg 3570; and OutEnableReg 3572. The decoded PADDR[7:0] may be provided to a SelectRdOrWrReg 3574.

The ESI read state machine 3560 and the ESI write state machine 3526 may be communicatively coupled to the address exception block 3558, the OutEnableReg 3572, and the SelectRdOrWrReg 3574 as shown.

The signals output from the SFF module 156 may be output from the SFFInterruptReg 3538, the multiplexer 3518, the registers 3562-3574, and the address exception block 3558, as shown. The value of the ParallelESIReg 3564 may also be coupled back to the ESI write state machine 3526.

Figure 36:
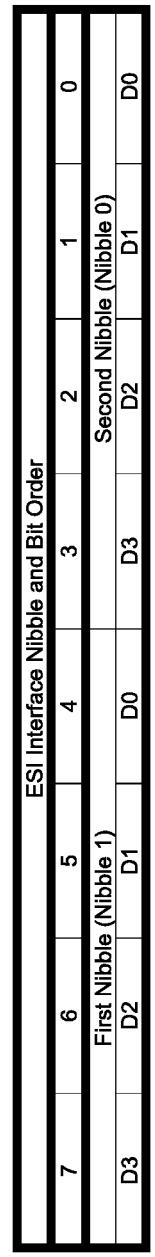
FIG. 36 is a table describing an ESI interface nibble and bit order in accordance with various embodiments of the present invention.
Figure 37:
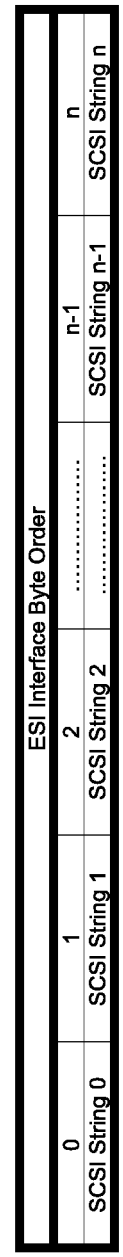
FIG. 37 is a table describing an ESI interface byte order in accordance with various embodiments of the present invention.

FIG. 36 is a table 3600 describing the ESI interface nibble and bit order in accordance with various embodiments of the present invention. FIG. 37 is a table 3700 describing the ESI interface byte order in accordance with various embodiments of the present invention. The D[3:0] signals may carry data between the ESP 132 and the SFF module 156. Subsequent nibbles may be provided in this interface according to the rules of byte ordering until all data that is desired to be transferred has been transferred. It may be noted that in some embodiments, nibble 1 may be in reference to RdOrWrByteReg[7:4] and nibble 0 may be in reference to RdOrWrByteReg[3:0].

All ESI interface transactions may utilize the ordering of nibbles, bytes, etc. as described in tables 3600 and 3700.

The following figures and description discuss timing of various operations of the SFF module 156, e.g., write phase and command phase transfers and read phase transfers, in accordance with various embodiments.

Figure 38:
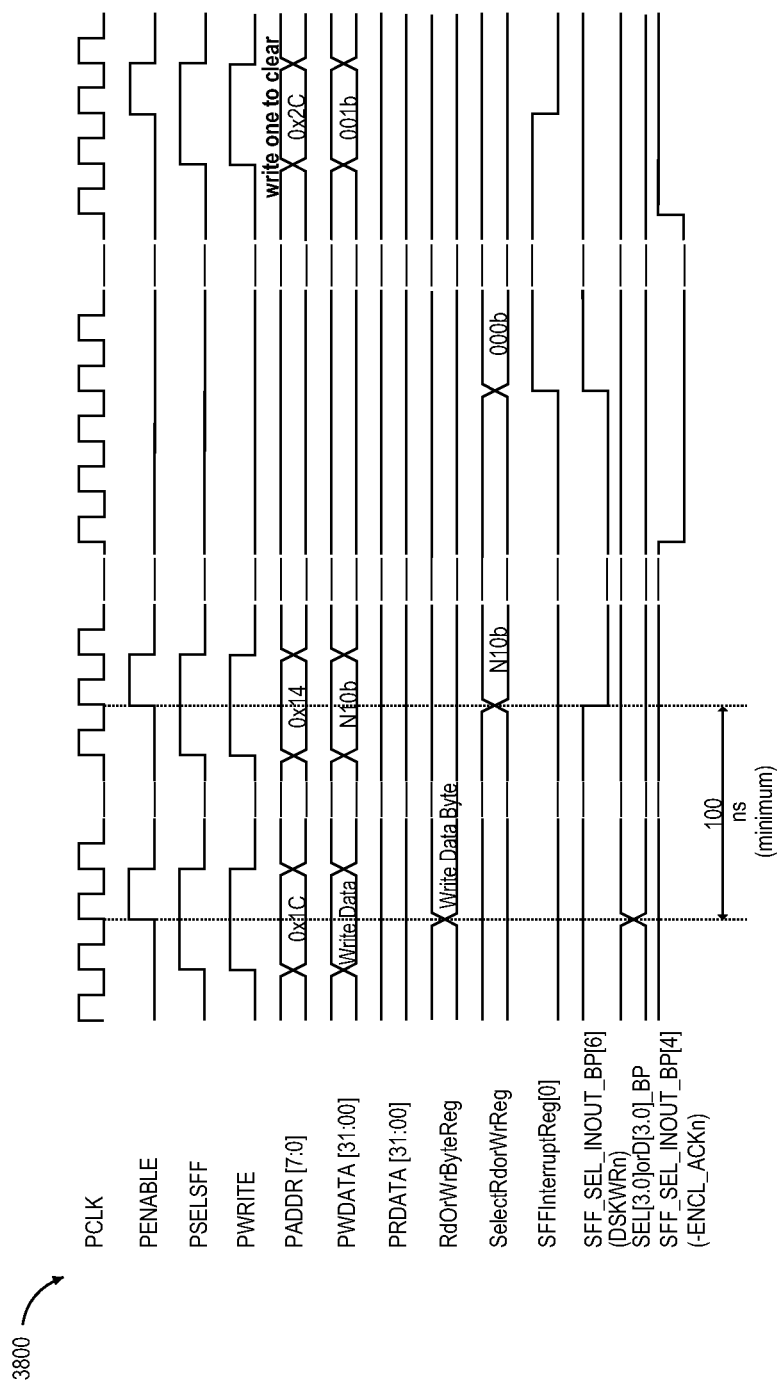
FIGS. 38-39 are timing diagrams related to a write phase and command transfer operations performed without the use of a write state machine in accordance with various embodiments of the present invention.
Figure 39:
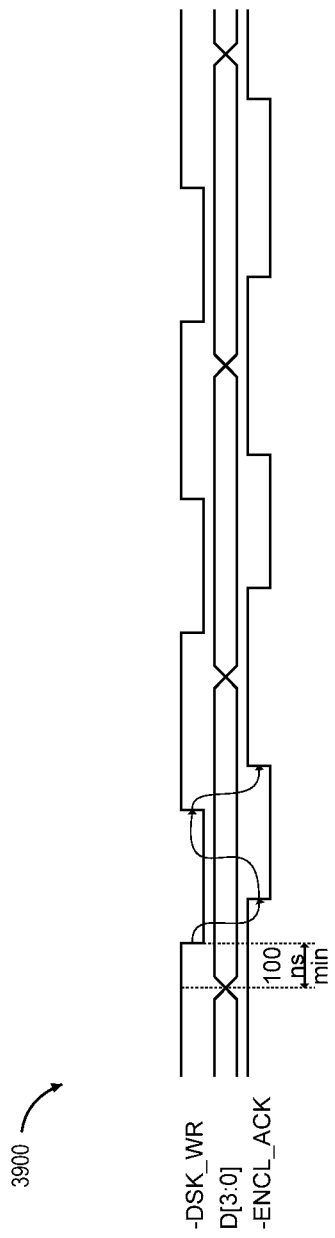

FIGS. 38-39 describe timing diagrams related to a write phase and command transfer operations performed without the use of the write state machine 3526 in accordance with various embodiments of the present invention. In particular, FIG. 38 is a nibble write phase timing diagram 3800 that illustrates how the timing on the APB 148 signals controlled by the control CPU 140 may relate to the ESI 134. FIG. 39 is a write phase timing diagram 3900 focusing on the perspective of the ESI 134 in accordance with various embodiments of the present invention. The timing diagrams 3800 and 3900 may show how the control CPU 140 may perform write phase and command transfer without hardware support from the state machines 160 of the SFF module 156, e.g., without using the write state machine 3526.

In some embodiments, to perform a write or command phase transfer, the control CPU 140 may place a first nibble of data on D[3:0] (RdOrWrByteReg[7:4]), and 100 nanoseconds later, the MDC 124 may assert (low) –DSK_WR (sets SelectRdorWrReg[1]). When the ESP 132 observes –DSK_WR asserted, it may read D[3:0] and assert (low) –ENCL_ACK. When the MDC 124 observes the asserted (low) signal –ENCL_ACK (ReadSELReg[4]), it may de-assert (high) –DSK_WR (SelectRdorWrReg[2]) and may be allowed to place new data in D[3:0]. If this is the last transfer before a read phase is to be initiated, then D[3:0] output enables may be turned off (SELOutEnblReg[3:0]) to allow the ESP 132 to drive D[3:0].

When the ESP 132 observes the signal –DSK_WR de-asserted, it may de-assert the signal –ENCL_ACK. The MDC 124 may then proceed with more write or read sequences. Each time the SFF module 156 places new data on the D[3:0], the data may be deskewed for a 100 ns before asserting –DSK_WR.

In some embodiments, the control CPU 140 may select the nibble of the RdOrWrByteReg 3568 to transfer each subsequent interface transaction by setting or clearing the NIBSEL bit in the SelectRdorWrReg 3574. However, the expected order of data may be as described in tables 3600 and 3700.

As each subsequent nibble transfer occurs the control CPU 140 may have the option of transferring a byte to the RdOrWrByteReg 3568 and selecting the appropriate nibble by setting and clearing the (N) NIBSEL bit in the SelectRdorWrReg 3574. An alternate solution may be to only transfer a nibble at a time from the control CPU 140 leaving the NIBSEL bit cleared.

Figure 40:
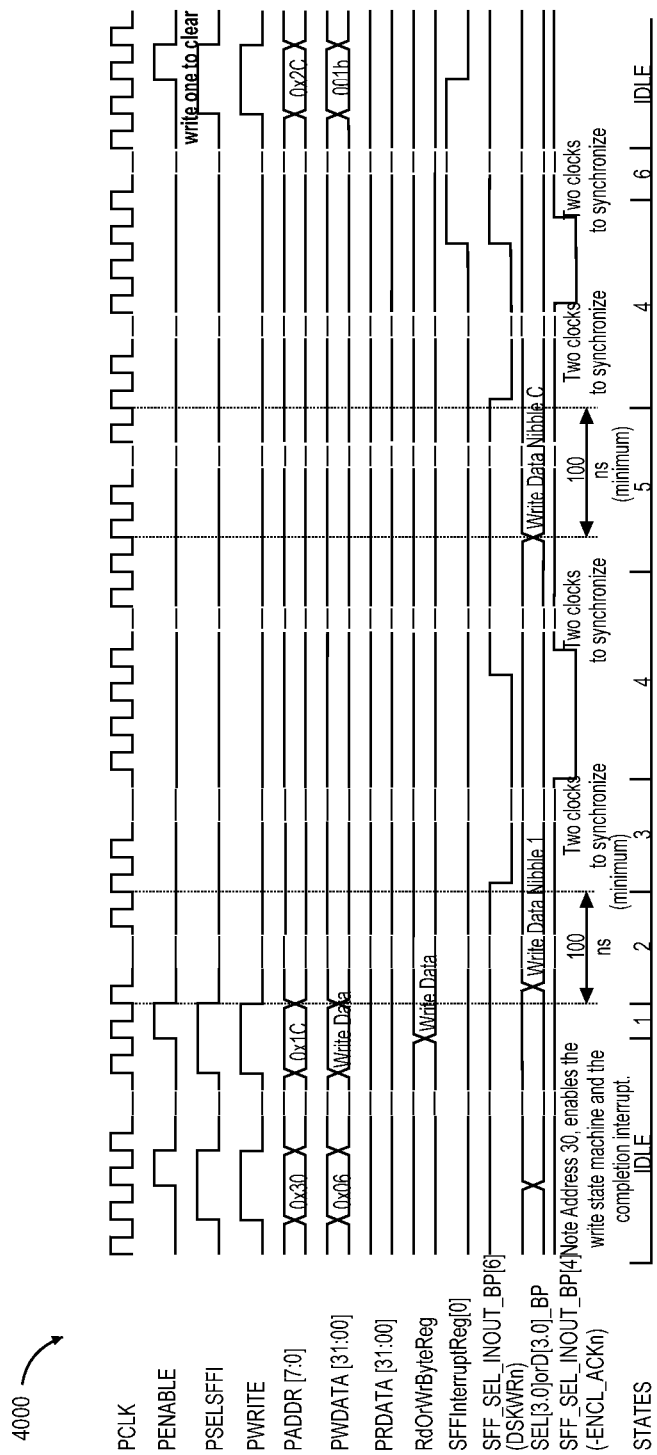
FIG. 40 is a write phase and command transfer timing diagram in accordance with various embodiments of the present invention.

FIG. 40 is a write phase and command transfer timing diagram 4000 in accordance with various embodiments of the present invention. The ESI write phase and command transfer procedure may be executed by the control CPU 140 using the ESI write state machine 3526. The timing diagram 4000 describes the sequence of events that may occur when the write state machine 3526 is used.

Figure 41:
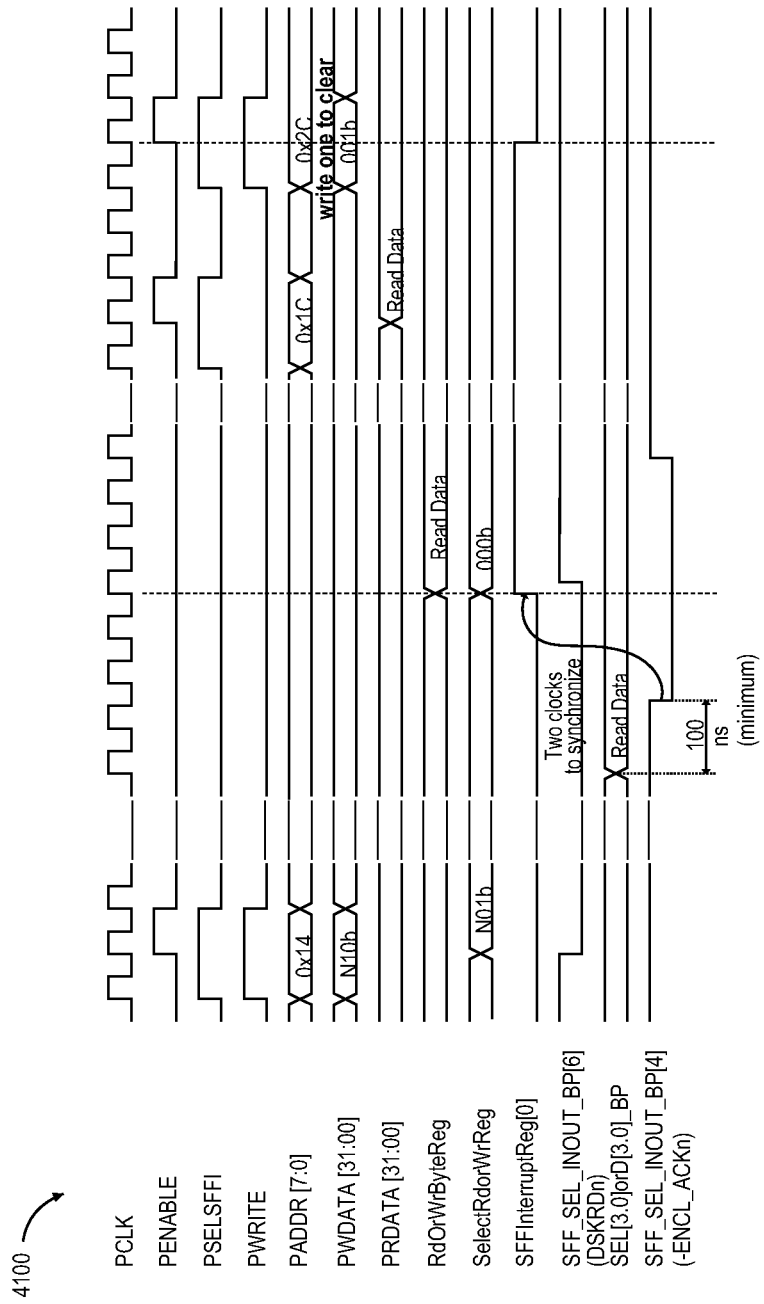
FIGS. 41-43 are timing diagrams related to read phase transfer procedures performed without the use of a read state machine in accordance with various embodiments of the present invention.
Figure 42:
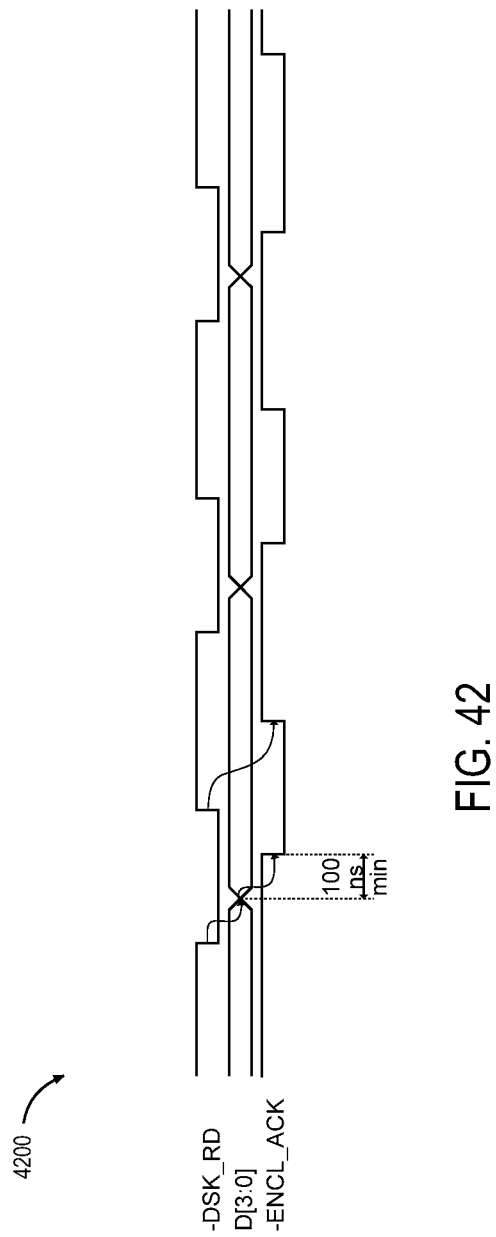
Figure 43:
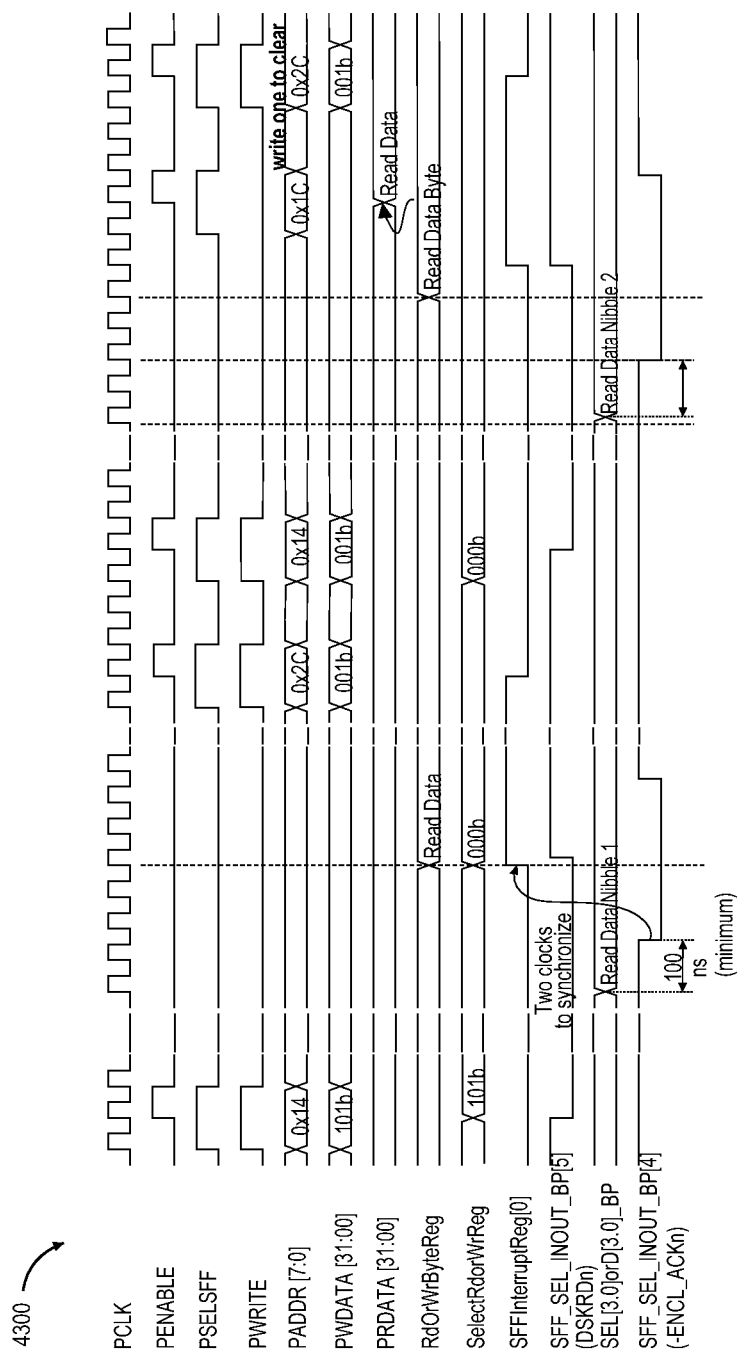

FIGS. 41-43 describe timing diagrams related to read phase transfer procedures performed without the use of read state machine 3560 in accordance with various embodiments of the present invention. In particular, and in accordance with various embodiments, FIG. 41 is a nibble read phase transfer timing diagram 4100 that illustrates how the timing on the APB 148, as controlled by the control CPU 140, may relate to the ESI 134; FIG. 42 is a read phase timing diagram 4200 focusing on the perspective of the ESI 134; and FIG. 43 is a byte read phase transfer timing diagram 4300 that illustrates how the timing on the APB 148, as controlled by the control CPU 140, may relate to the ESI 134.

To perform a read phase transfer, the MDC 124 may assert –DSK_RD (SelectRdOrWrReg[0]=1). When the ESP 132 observes –DSK_RD asserted (low), it may place the first nibble of data on D[3:0], and 100 nanoseconds later, assert (low) –ENCL_ACK. When the MDC 124 observes the asserted –ENCL_ACK (ReadSELReg[4]), it may load D[3:0] into (RdOrWrByteReg) based on the NIBSEL bit in the SelectRdorWrReg 3574 and de-assert (high) –DSK_RD (SelectRdorWrReg[0]). When the ESP 132 observes –DSK_RD de-asserted, it may de-assert –ENCL_ACK and place new data in D[3:0]. The MDC 124 may then proceed with more read phase transfers.

Figure 44:
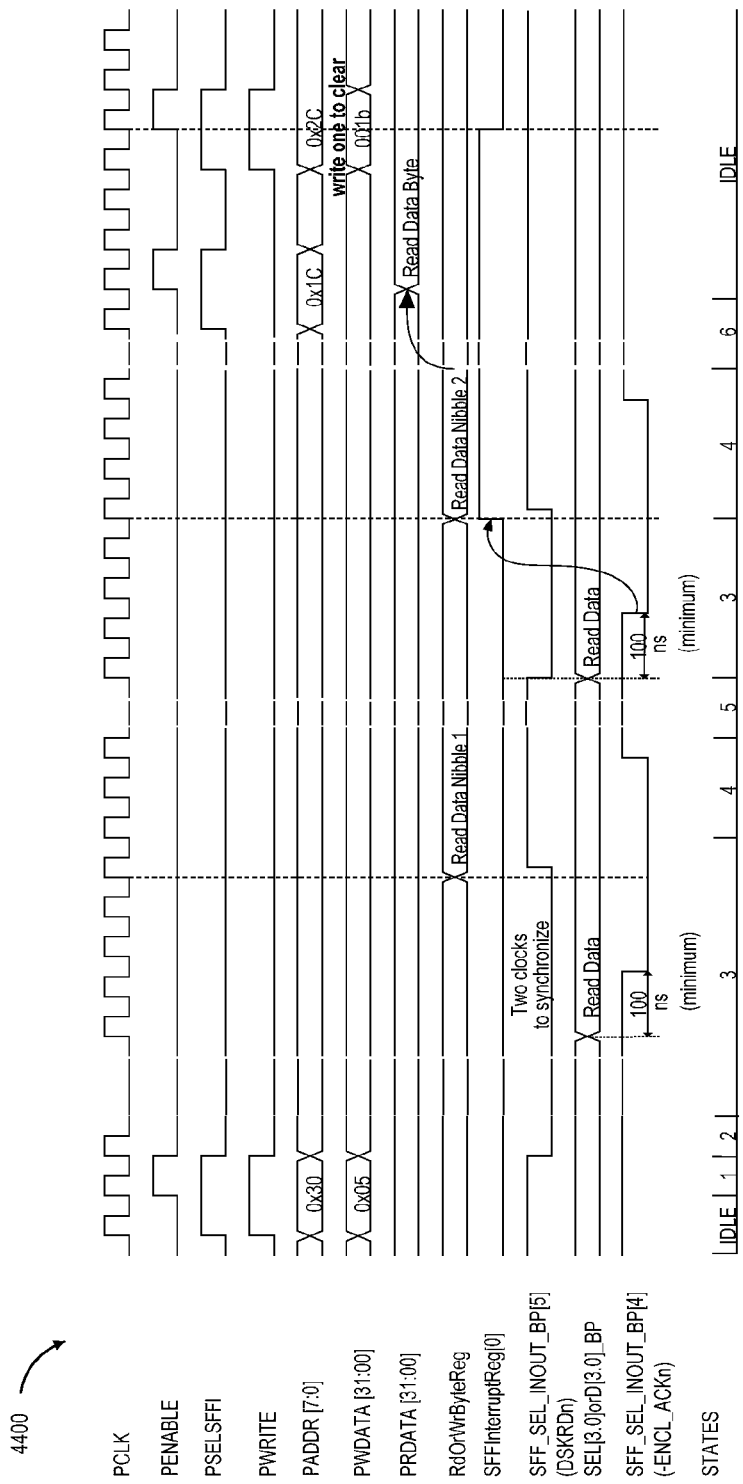
FIG. 44 is a read phase transfer timing diagram in accordance with various embodiments of the present invention.

FIG. 44 is a read phase transfer timing diagram 4400 in accordance with various embodiments of the present invention. The read phase transfer procedure in this embodiment may be executed by the control CPU 140 using the read state machine 3560. The timing diagram 4400 describes the sequence of events when the read state machine 3560 is used. Use of the read state machine 3560 as described by the timing diagram 4400 may allow for the transfer of information between the ESI 134 and the SFF module 156 to occur at a relatively fast rate without constant supervision by the control CPU 140.

In various embodiments, a synchronizing signal for read phase and write phase operations may be the interface signal –ENCL_ACK. This may be an input signal to the SFF module 156 controlled by the ESP 132.

The control CPU 140 may choose to poll signal –ENCL_ACK (ReadSELReg[4]) for its active state (low) or use the interrupt generated by the high to low transition (SFFnterruptReg[0]). The ESP 132 may assert (low) this signal to indicate that the write data has been received or that read data is available.

Figure 45:
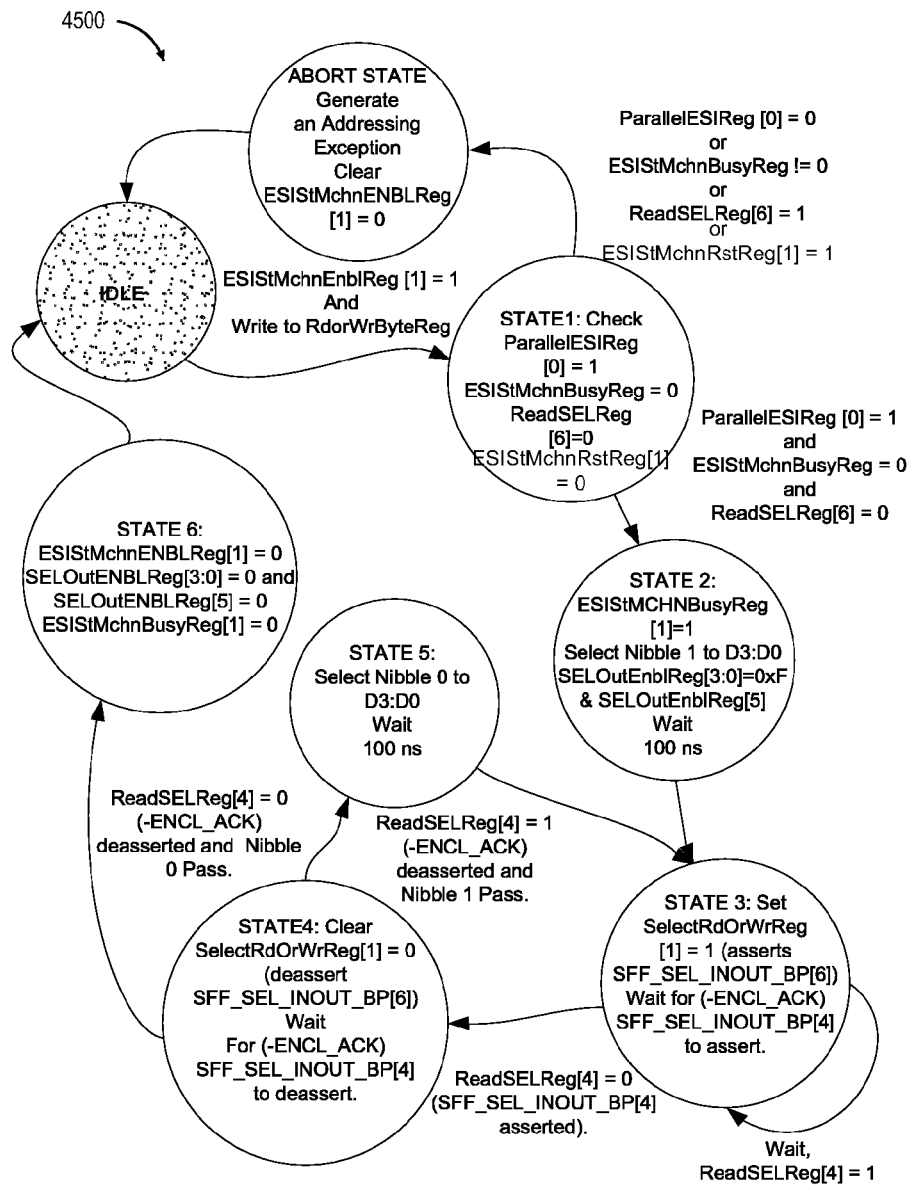
FIG. 45 is a flow diagram depicting an operation of a write state machine in accordance with various embodiments of the present invention.

FIG. 45 is a flow diagram 4500 depicting an operation of the write state machine 3526 in accordance with various embodiments of the present invention. In some embodiments, the write state machine 3526 may execute a write phase transfer procedure in the ESI 134 when the control CPU 140 loads the RorWByteReg with a byte of data to be transferred to the ESP 132 and then enables the write state machine 3526, by writing two (0x2) to the state machine enable register (ESIStMchnENBLReg[1]=1).

In state one, the write state machine 3526 may perform various checks to ensure that it is ready to execute a write phase transfer procedure. If either the read state machine 3560 or the write state machine 3526 are busy (ESIStMchnBusyReg≠0), the –PARALLEL_ESI is not asserted (ParalleIESIReg[0]=0) (indicating, e.g., that the ESP 132 is not ready to accept the operation), the –DSK_WR (ReadSELReg[6]=1) is already asserted (indicating, e.g., an abnormality on the ESI 134), or the ESIStMchnRstReg[1]=1 the write transaction may be aborted in the abort state. In the abort state, an address exception may be generated and the ESIStMchnENBLReg may be cleared, e.g., ESIStMchnENBLReg[1] set to zero. If the state one checks clear, the write state machine 3526 may proceed to state two.

In state two, the write state machine 3526 may provide an indication that it is busy (set StMCHNBusyReg[1]=1); select the nibble of data to be transmitted (select nibble 1 to D[3:0]); and open up the circuitry to go to the ESI 134 (SELOutEnblReg[3:0]=0xF and SELOutEnblReg[5]=0x1). The write state machine 3526 may then wait a skewing value, e.g., 100 nanoseconds (ns), before proceeding to state three.

In state three, the write state machine 3526 may set the SelectRdOrWrReg[1]=1 and assert −DSK_WR on SFF_SEL_INOUT_BP[6]. The write state machine 3526 may then wait for the ESP 132 to detect the assertion of the −DSK_WR signal, retrieve the data in signal D[3:0] and assert −ENCL_ACK signal to indicate that the data has been retrieved. When the write state machine 3526 detects the assertion of −ENCL_ACK on SFF_SEL_INOUT_BP[4], it may set an internal register ReadSELReg[4]=0 and proceed to state four.

In state four, the write state machine 3526 may set SelectRdOrWrReg [1]=0, deassert SFF_SEL_INOUT_BP[6], and wait for −ENCL_ACK to deassert on SFF_SEL_INOUT_BP [4]. If −ENCL_ACK is deasserted on the nibble 1 pass (the pass that transfers the first nibble of the byte) (ReadSELReg [4]=1), the write state machine 3526 may determine that there is more data to send and may proceed to state five.

In state five, the write state machine 3526 may select the next nibble of the byte to be transmitted, e.g., select nibble 0 to D[3:0], wait the skewing value, and loop back to state three.

If, while in state four, −ENCL_ACK is deasserted on the nibble 0 pass (the pass that transfers the second nibble of the byte) (ReadSELReg[4]=1), the write state machine 3526 may determine that there are no more nibbles to send and may proceed to state six.

In state six, the write state machine 3526 may reset the registers (e.g., ESIStMchnENBLReg[1]=0; SELOutENBLReg[3:0]=0; SELOutENBLReg[5]=0; and ESIStMchnBusyReg[1]=0) and return to the idle state.

The SFF module 156 may detect the transition of −ENCL_ACK from high to low, when the write state machine 3526 is transitioning from state four to state six, and generate an interrupt (if the corresponding interrupt request (IRQ) is enabled). This interrupt may alert the control CPU 140 that the ESP 132 has retrieved the data. If the IRQ is disabled, the control CPU 140 may poll the busy bit (ESIStMchnBusyReg [1]) of the write state machine 3526 until it clears before retrieving the data.

A write phase transfer procedure, similar to the one discussed with respect to FIG. 45 but from the perspective of the control CPU 140 may be described as follows. Prior to a write transfer procedure the control CPU 140 may verify that ParallelESIReg[0] is set (−PARALLEL_ESI is asserted); the read state machine 3560 and write state machine 3526 are not busy (ESIStMchnBusyReg [1:0]=0); and that the DSK_WR is not asserted (ReadSELReg[6]=1).

Following these confirmations, the control CPU 140 may write the data to be transferred to the ESP 132 in register RdOrWrByteReg and then enable the write state machine 3526 by writing two (0x2) to the state machine enable register (ESIStMchnENBLReg[1]=1). The control CPU 140 may then move on to other tasks without providing constant supervision of the write transfer procedure. The control CPU may be alerted when the write transfer procedure is complete by receiving an interrupt from IC 164 (if the IRQ is enabled). As stated above, if the IRQ is disabled, the control CPU 140 may poll the busy bit of the write state machine 3526 to determine when the operation is complete.

Figure 46:
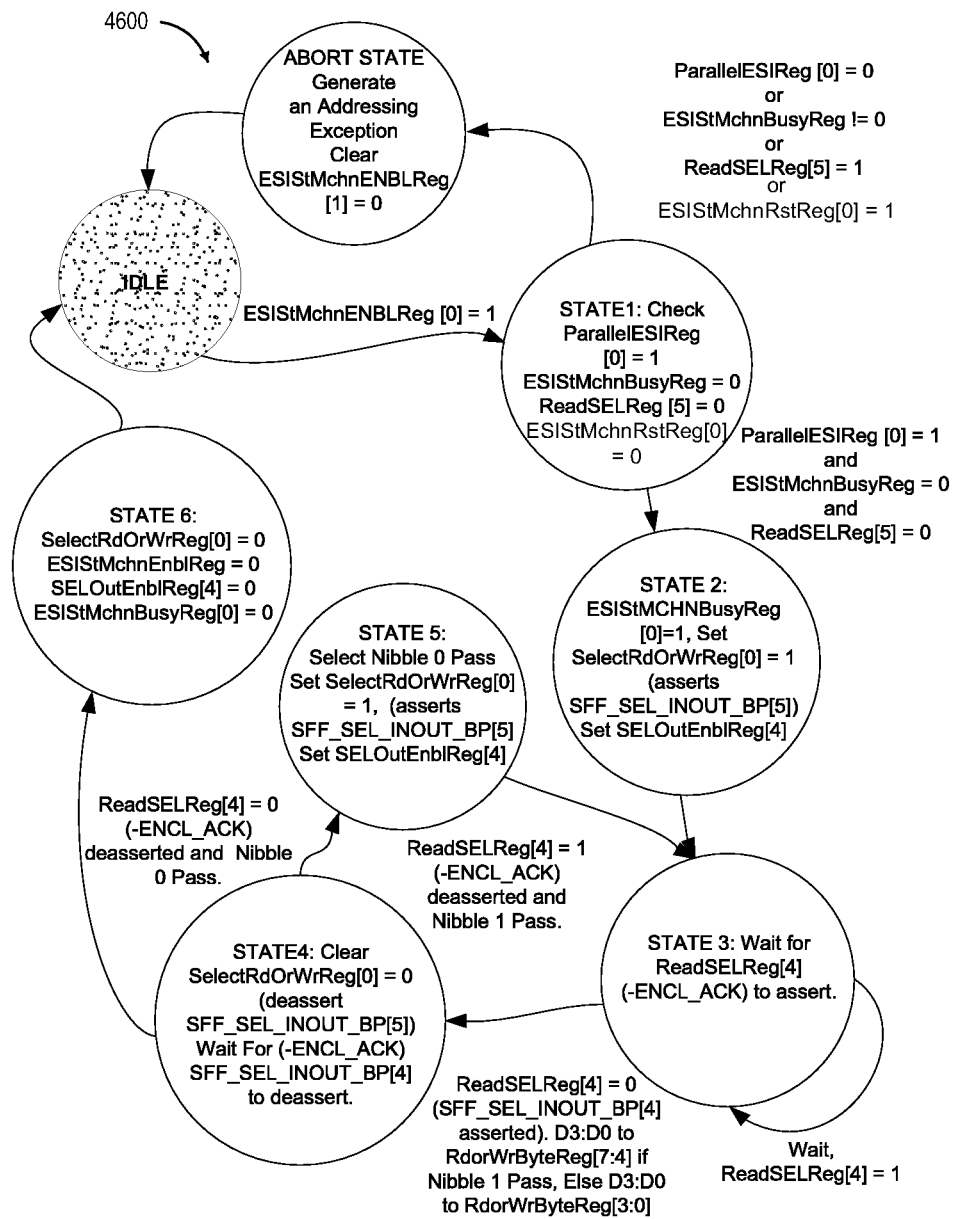
FIG. 46 is a flow diagram depicting an operation of the read state machine in accordance with various embodiments of the present invention.

FIG. 46 is a flow diagram 4600 depicting an operation of the read state machine 3560 in accordance with various embodiments of the present invention. In some embodiments, the read state machine 3560 may execute a read phase transfer procedure in the ESI 134 when enabled by the control CPU 140, e.g., when the control CPU 140 writes a one (0x1) to the ESIStMchnENBLReg[0].

In state one, the read state machine 3560 may perform various checks to ensure that it is ready to execute a read phase transfer procedure. If either the read state machine 3560 or the write state machine 3526 are busy (ESIStMchnBusyReg≠0), the −PARALLEL_ESI is not asserted (ParallelESIReg[0]=0) (indicating, e.g., that the ESP 132 is not ready to accept the operation), the −DSK_RD (ReadSELReg[5]=0) is already asserted (indicating, e.g., an abnormality on the ESI 134), or the ESIStMchnRstReg[0]=1 the read transaction may be aborted in the abort state. In the abort state, an address exception may be generated and the ESIStMchnENBLReg may be cleared, e.g., ESIStMchnENBLReg[0] set to zero. If the state one checks clear, the read state machine 3560 may proceed to state two.

In state two, the read state machine 3560 may provide an indication that it is busy (set StMCHNBusyReg[0]=1) and prepare the hardware for read transfer by setting SelectRdOrWrReg[0]=1, asserting SFF_SEL_INOUT_BP[5], and setting SELOutEnblReg[4]. The read state machine 3560 may then proceed to state three.

In state three, the read state machine 3560 may detect for the assertion of the −ENCL_ACK signal, e.g., transition of the −ENCL_ACK signal from high to low. When −ENCL_ACK asserts, the ReadSELReg[4] may be set to zero and the read state machine 3560 may proceed to state four.

In state four, the read state machine 3560 may load D[3:0] into the RdOrWrByteReg (if nibble 1, D[3:0] may be loaded into RdOrWrByteReg[7:4], else D[3:0] may be loaded into RdOrWrByteReg[3:0]). The read state machine 3560 may clear SelectRdOrWrReg[0] by setting it equal to zero (deassert SFF_SEL_INOUT_BP[5]) and wait for the SFF_SEL_INOUT_BP[4] (−ENCL_ACK) to deassert. If there is another nibble to receive (based on if this is nibble one pass or nibble zero pass), e.g., ReadSELReg[4] equals one, −ENCL_ACK is deasserted, and nibble one passes, the read state machine 3560 may proceed to state five.

In state five, the read state machine 3560 may prepare the hardware for the next nibble by selecting nibble 0 pass, setting SelectRdOrWrReg[0] equal to one (assert SFF_SEL_INOUT_BP[5]) and then loop back to state three.

If it is determined, in state four, that both nibbles have been sent, e.g., ReadSELReg[4] equals zero, −ENCL_ACK is deasserted, and nibble zero passes, the read state machine 3560 may proceed to state six.

In state six, the read state machine 3560 may reset the registers (e.g., SelectRdOrWrReg[0]=0; ESIStMchnEnblReg[0]=0; SELOutEnblReg[4]=0; and ESIStMchnBusyReg [0]=0) and return to the idle state.

A read phase transfer procedure, similar to the one discussed with respect to FIG. 46 but from the perspective of the control CPU 140 may be described as follows. Prior to initiating a read phase transfer procedure, the control CPU 140 may verify that the ParallelESIReg[0] is set (−PARALLEL_ESI is asserted); the read state machine 3560 and the write state machine 3526 are not busy (ESIStMchnBusyReg [1:0]=0); and DSK_RD is not asserted (ReadSELReg[5]=1). The control CPU 140 may start the read state machine 3560 by writing a one (0x1) to the ESIStMchnENBLReg[0]. The control CPU 140 may then move on to other tasks as the read state machine 3560 and the ESP 132 perform the remaining read operation.

Upon starting, the read state machine 3560 may assert the −DSK_RD signal and the ESP 132, upon detection of the assertion of the −DSK_RD signal, may set the data to be transferred in signal D[3:0] and wait for 100 ns before asserting the −ENCL_ACK signal. The SFF module 156 may detect the transition of the −ENCL_ACK signal from high to low and, if transitioning the first nibble, e.g., nibble one pass, load D3:0 into the RdOrWrByteReg[7:4], or, if transitioning the second nibble, e.g., nibble zero pass, load D3:0 into RdOr-WrByteReg[3:0]. Deassert –DSK_RD and wait for –ENCL_ACK to deassert. If in the nibble one pass, the read state machine 3560 and the ESP 132 may perform similar operations for the nibble zero pass.

Once the byte of data is loaded in the RdOrWrByteReg, the read state machine 3560 may generate an interrupt through the IC 164 (if corresponding IRQ is enabled). The control CPU 140 may then service the interrupt and retrieve the data in RdOrWrByteReg[7:0]. The read state machine 3560 may detect the control CPU 140 recovering the data through an APB 148 read of the RdOrWrByteReg[7:0] and complete the cycle.

The state machines 160 of the SFF module 156 may, in addition to performing read and write transfer functions, perform device control functions. The SFF module 156 may receive a control function code from the backplane via DEV_CTRL_CODE 0 through DEV_CTRL_CODE 2. These functions may include, but are not limited to, FC link rate, power failure warning, and hard reset. For each of these functions the SFF Module 156 may provide a state machine to facilitate the detection of the different conditions.

Briefly, the LR state machine 3524 may detect the link rate values presented by the backplane. If the value presented is not supported, the MDC 124 may remain in a bypassed state on the ports of the SCSI 112 until the LR state machine 3524 detects a supported value on the DEV_CTRL_CODE signals.

Figure 47:
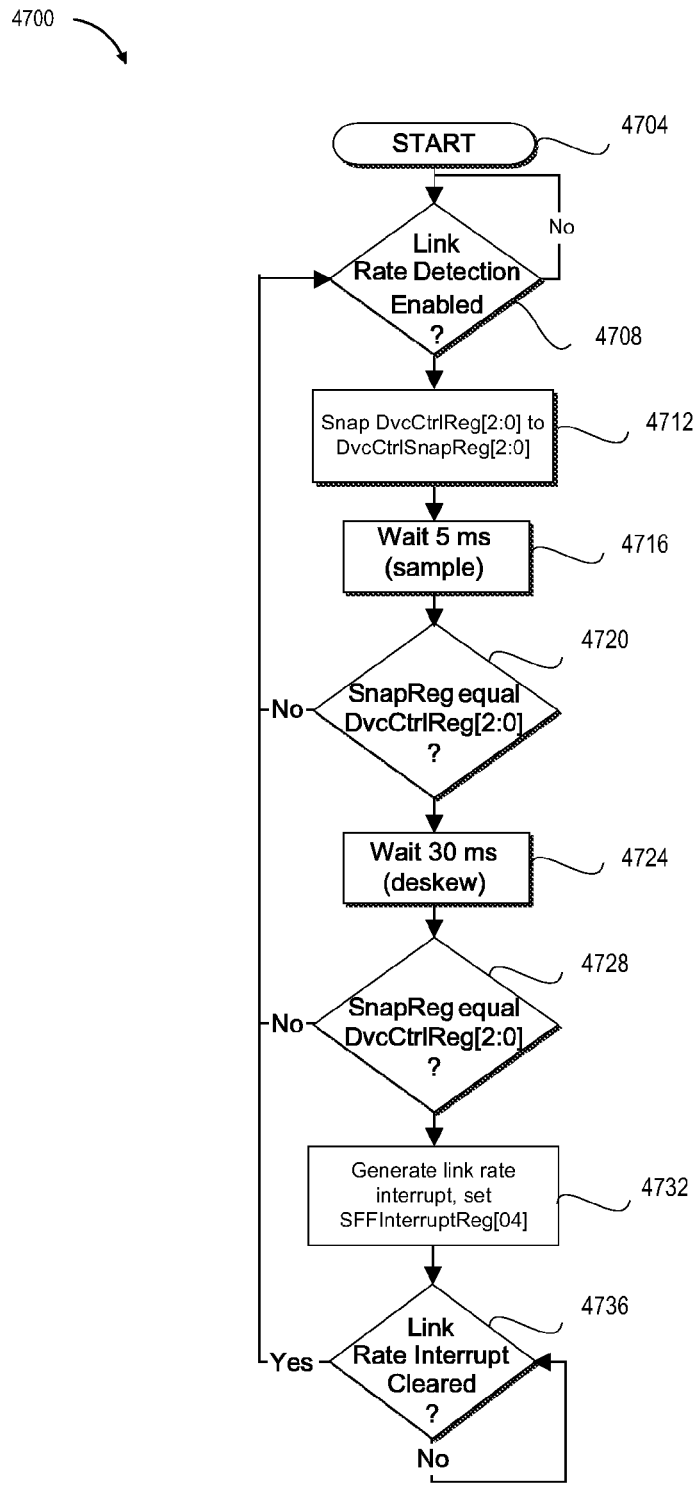
FIG. 47 is a flowchart depicting an operation of a link rate state machine in accordance with various embodiments of the present invention.

FIG. 47 is a flowchart 4700 depicting an operation of the LR state machine 3524 in accordance with various embodiments of the present invention. The operation may begin in block 4704 and proceed to block 4708 where the LR state machine 3524 determines if LR detection is enabled by the control CPU 140 (DCCFunctionEnableReg[2]). The control CPU 140 may enable LR detection 250 milliseconds (ms) after it detects a mated control signal.

When LR detection is enabled, the LR state machine 3524 may snap DvCtrlReg[2:0] to DvcCtrlSnapReg[2:0] in block 4712, wait 5 ms in block 4716, and determine if the SnapReg is still equal to DvcCtrlReg[2:0] in block 4720. If not, the LR state machine 3524 may loop back to block 4708. If the SnapReg is still equal to DvcCtrlReg[2:0] in block 4720, the LR state machine 3524 may wait a deskew amount of time, e.g., 30 ms, in block 4724 and again determine if the SnapReg is equal to the DvcCtrlReg[2:0] in block 4728. If it is not equal in block 4720 or 4728, the process may loop back to block 4708. If it is equal in block 4728, the process may advance to block 4732 where the LR state machine 3524 may generate a link rate interrupt and set SFFInterruptReg[04] in block 4732. The link rate interrupt may be generated by setting the corresponding bit in the DCC function status register, e.g., DCCFunctionStatusReg[2] (assuming the SFF interrupt is enabled). After setting DCCFunctionStatusReg[2], the LR state machine 3524 may wait until it clears in block 4736 and then loop back to block 4708.

Figure 48:
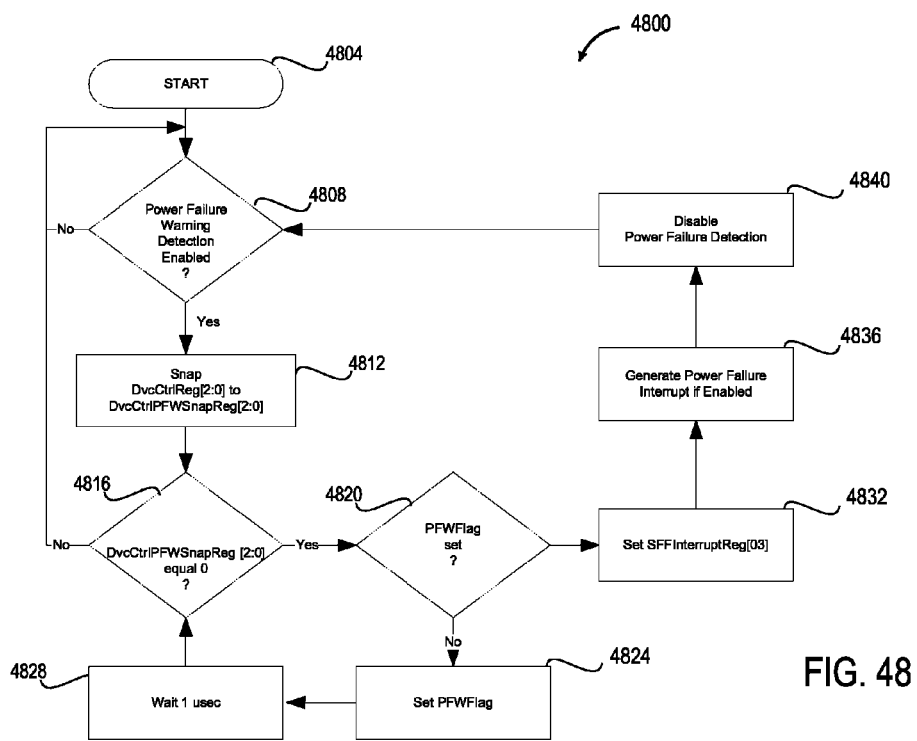
FIG. 48 is a flowchart depicting an operation of a power failure warning state machine in accordance with various embodiments of the present invention.

FIG. 48 is a flowchart 4800 depicting an operation of the PFW state machine 3522 in accordance with various embodiments of the present invention. The operation may begin in block 4804 and proceed to block 4808 where the PFW state machine 3522 may determine whether PFW detection is enabled. In some embodiments, the control CPU 140 may enable PFW detection by setting bit DCCFunctionEnableReg [1].

If the PFW detection is enabled, the PFW state machine 3522 may snap DvcCtrlReg[2:0] to DvcCtrlPFWSnapReg[2:0] in block 4812 and then detect for a PFW code (e.g., with a value of 0) presented by the backplane via the DEV_CTRL_CODE signals in block 4816. If a PFW code is detected, the PFW state machine 3522 may determine if a PFWFlag is set in block 4820. If a PFWFlag is not set, the PFW state machine 3522 may set the flag in block 4824, wait for deskewing in block 4828, and loop back to block 4816.

If the PFWFlag is set in block 4820, the PFW state machine 3522 may set SFFInterruptReg[03] in block 4832, generate a power failure interrupt (if enabled) by, e.g., setting DCCFunctionStatusReg[1] in block 4836, and then disable the PFW detection in block 4840. Due to the disabling operation in block 4840, the control CPU 140 may re-enable the PFW state machine 3522 after each detection of a PFW.

The HR state machine 3520 may detect HR sequences transmitted in the DEV_CTRL_CODE signals by the backplane. There may be, e.g., two sequence of values; one for the case in which the DEV_CTRL_CODE signals are selecting an FC Link Rate of 4.25 GHz (DEV_CTRL_CODE=5) before starting the sequence, and another for all other cases.

The control CPU 140 may enable the HR state machine 3520 by setting bit DCCFunctionEnableReg[0]. The HR state machine 3520, upon detection of a valid HR sequence in the DEV_CTRL_CODE signals, may set DCCFuntionStatusReg [0], which, if enabled, may generate an SFF interrupt.

After setting DCCFunctionStatusReg[0], the HR state machine 3520 may pause until this bit is cleared.

Figure 49:
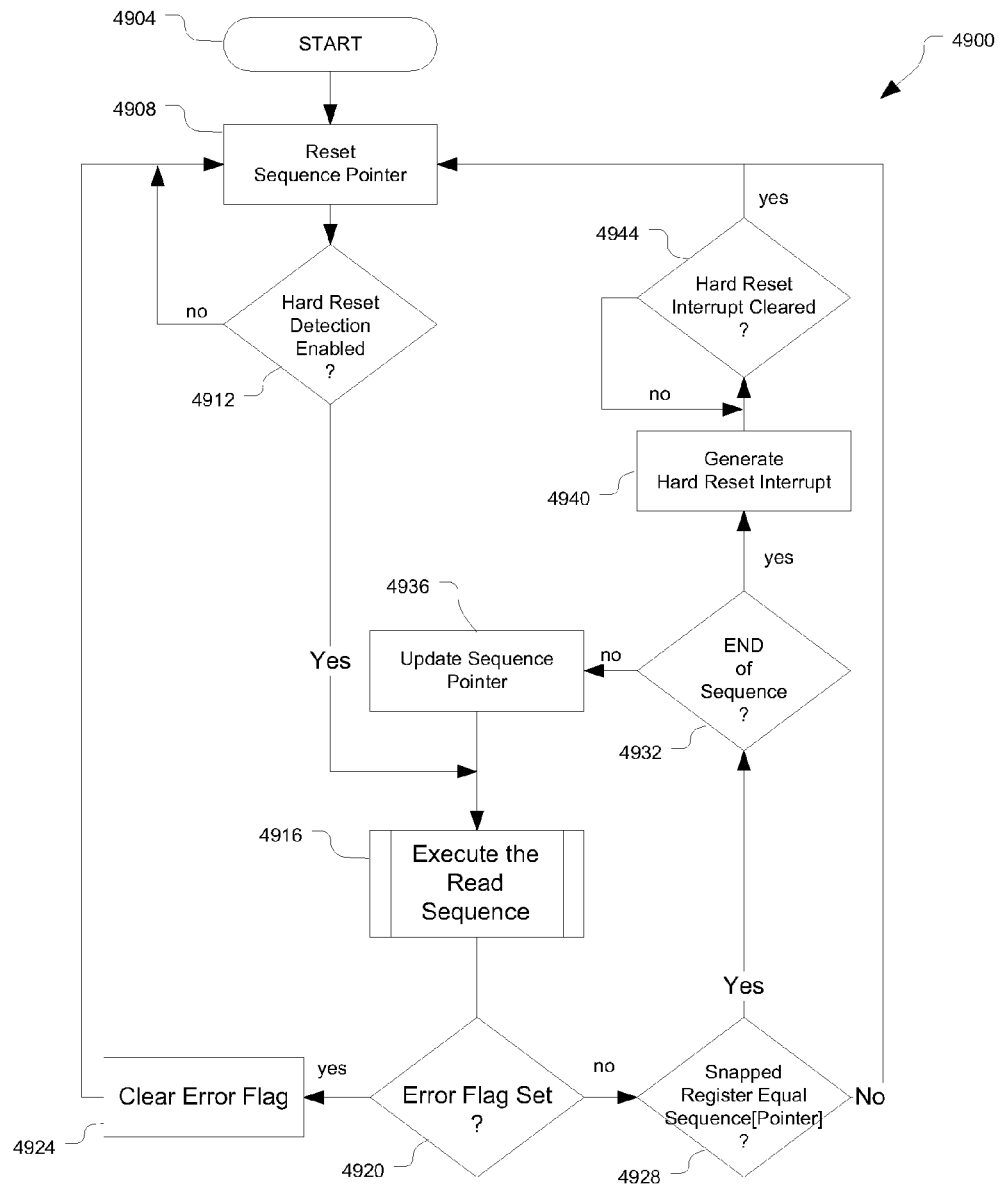
FIGS. 49 and 50 illustrate flowcharts describing the implementation of a hard reset state machine in accordance with various embodiments of the present invention.
Figure 50:
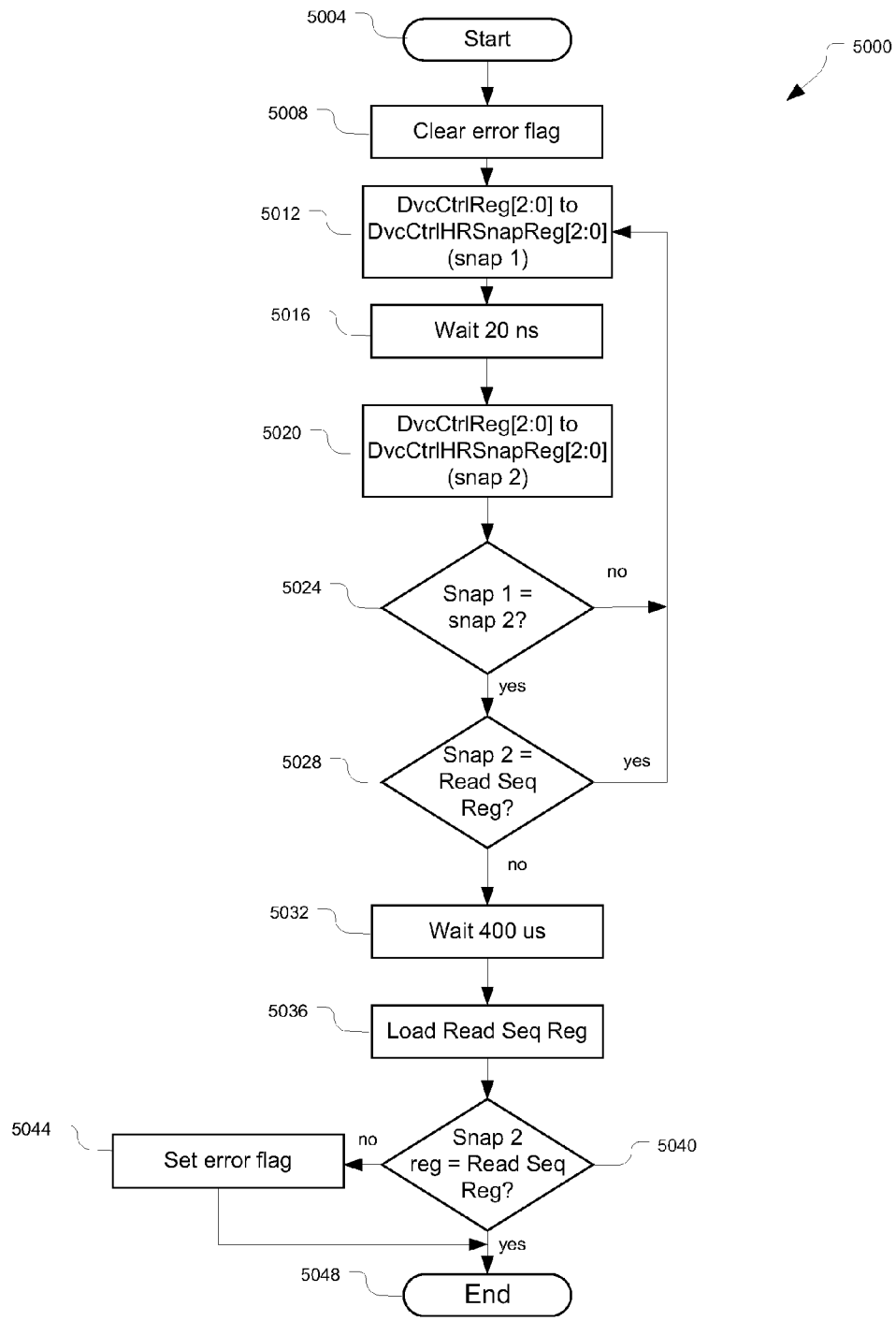

FIGS. 49 and 50 respectively illustrate flowcharts 4900 and 500 describing the implementation of the HR state machine 3520 in accordance with various embodiments of the present invention. In particular, flowchart 4900 depicts the main operation of the HR state machine 3520 and flowchart 5000 depicts the read sequence operation, e.g., describing reading and validation of a DEV_CTRL_CODE signals values.

FIG. 51 is a table 5100 describing a hard reset sequence used by the HR state machine 3520 in accordance with various embodiments of the present invention.

Figure 52:
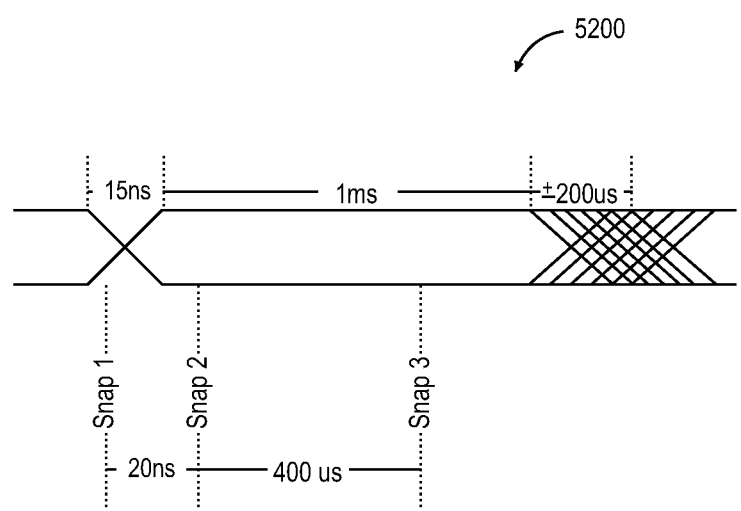
FIG. 52 is a timing diagram describing how a hard reset state machine reads and validates the read of DEV_CTRL_CODE signal in various embodiments of the present invention.

FIG. 52 is a timing diagram 5200, which, together with the HR State Machine Read Sequence describes how the HR State Machine 3520 reads and validates the read of the DEV_CTRL_CODE signal in various embodiments of the present invention. It may be noted that the 400 us time is programmable. The firmware may set the HRCntrlLdReg value after reset. A default reset value may be 4E2h, which is 400 us.

Referring now to FIG. 49, the HR state machine 3520 may begin a hard reset operation at block 4904 and proceed to reset sequence pointer in block 4908. The HR state machine 3520 may then determine whether the HR detection has been enabled by the control CPU 140 in block 4912. If it has, the process may advance to execution of the read sequence in block 4916.

Referring now to FIG. 50, the HR state machine 3520 may begin a read sequence operation at block 5004 and clear an error flag in block 5008. The HR state machine 3520 may then do a first snap by snapping the DvcCtrlReg[2:0] to DvcCtrl-HRSnapReg[2:0] in block 5012 and proceed to wait a certain amount of time, e.g., 20 ns, in block 5016. The HR state machine 3520 may then do a second snap by snapping the DvcCtrlReg[2:0] to DvcCtrlHRSnapReg[2:0] again in block 5020. The HR state machine 3520 may then determine if the snapped register is the same as a previous value in block 5024. If the snapped register is the same, the process may loop back to block 5012.

If the snapped register is not the same, the HR state machine 3520 may proceed block 5028 to determine whether the second snap equals the read sequence register. If so, the process may loop back to block 5012. If not, the HR state machine 3520 may wait another amount of time, e.g., another amount, e.g., 400 microseconds (us), in block 5032 and load read sequence register in block 5036. It may then be determined if the second snap equals the read sequence register in block 5040. If not, an error flag may be set in block 5044. If so, the process may end in block 5044.

Referring back to FIG. 49, the HR state machine 3520 may determine if the error flag is set in block 4920. If it is, the error flag may be cleared in block 4924 and the process may loop back to block 4908.

If it is determined that the error flag is not set in block 4920, the HR state machine 3520 may determine whether the snapped register is equal to the sequence pointer in block 4928. If not, the process may loop back to block 4908. If the snapped register is equal to the sequence pointer, the HR state machine 3520 may determine if it is the end of the sequence in block 4932.

If it is not the end of the sequence, the sequence pointer may be updated in block 4936 and the read sequence may be executed again in block 4916. If it is the end of the sequence, the HR state machine 3520 may generate a hard reset interrupt in block 4940 and wait until the interrupt is cleared in block 4944 before looping back to block 4908.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that the invention be limited only by the claims and the equivalents thereof.

What is claimed is:

1. An apparatus comprising:
   a control processor configured to control operation of a managed device; and
   an interface module having one or more state machines communicatively coupled to the control processor, the one or more state machines configured to
   receive instructions from the control processor, and
   communicate with an enclosure services processor to perform an enclosure service operation based on the instructions received from the control processor, wherein
   the enclosure service operation is a power failure warning (PFW) operation, and
   the one or more state machines comprise a PFW state machine configured to receive a PFW signal from the enclosure services processor and transmit an interrupt signal to the control processor based on the PFW signal.

2. An apparatus comprising:
   a control processor configured to control operation of a managed device; and
   an interface module having one or more state machines communicatively coupled to the control processor, the one or more state machines configured to
   receive instructions from the control processor, and
   communicate with an enclosure services processor to perform an enclosure service operation based on the instructions received from the control processor, wherein
   the enclosure service operation is a hard reset operation, and
   the one or more state machines comprise a hard reset state machine configured to receive signals from the enclosure services processor, to detect a hard reset sequence in the received signals, and to transmit an interrupt signal to the control processor based on the detected hard reset sequence.

* * * * *